(12) United States Patent
Cwik et al.

(10) Patent No.: US 9,476,612 B2
(45) Date of Patent: Oct. 25, 2016

(54) BEAM-FORMING CONCENTRATING SOLAR THERMAL ARRAY POWER SYSTEMS

(75) Inventors: Thomas A. Cwik, La Canada, CA (US); Paul E. Dimotakis, Altadena, CA (US); Daniel J. Hoppe, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 206 days.

(21) Appl. No.: 13/417,120

(22) Filed: Mar. 9, 2012

(65) Prior Publication Data

US 2012/0228883 A1    Sep. 13, 2012

Related U.S. Application Data

(60) Provisional application No. 61/450,928, filed on Mar. 9, 2011, provisional application No. 61/593,744, filed on Feb. 1, 2012.

(51) Int. Cl.
*F24J 2/10* (2006.01)
*F24J 2/12* (2006.01)
(Continued)

(52) U.S. Cl.
CPC ............. *F24J 2/5413* (2013.01); *F03G 6/065* (2013.01); *F03G 6/067* (2013.01); *F24J 2/10* (2013.01);
(Continued)

(58) Field of Classification Search
CPC ................. F24J 2/10; F24J 2/12; F24J 2/13; F24J 2/14; F24J 2/15; F24J 2/16; F24J 2/18; F24J 2/38; F24J 2002/1004; F24J 2002/1019; F24J 2002/1023; F24J 2002/1061; F24J 2002/1076; F24J 2002/108; F24J 2002/1085; F24J 2002/109

USPC ........... 60/641.8–641.15; 126/569, 571, 573, 126/600, 683, 690, 696, 694, 693, 692
See application file for complete search history.

(56) References Cited

U.S. PATENT DOCUMENTS 3,171,403 A * 3/1965 Drescher ........................ 126/603
3,924,604 A * 12/1975 Anderson ...................... 126/606
(Continued)

FOREIGN PATENT DOCUMENTS

| JP | 08-222017 | 8/1996 |
| JP | 2003-329963 | 11/2003 |
| JP | 4420902 | 2/2010 |

OTHER PUBLICATIONS

English Language Machine Translation of JP08222017.*
(Continued)

*Primary Examiner* — Nicholas J Weiss
*Assistant Examiner* — Wesley Harris
(74) *Attorney, Agent, or Firm* — Lewis Roca Rothgerber Christie LLP

(57) ABSTRACT

The present invention relates to concentrating solar-power systems and, more particularly, beam-forming concentrating solar thermal array power systems. A solar thermal array power system is provided, including a plurality of solar concentrators arranged in pods. Each solar concentrator includes a solar collector, one or more beam-forming elements, and one or more beam-steering elements. The solar collector is dimensioned to collect and divert incoming rays of sunlight. The beam-forming elements intercept the diverted rays of sunlight, and are shaped to concentrate the rays of sunlight into a beam. The steering elements are shaped, dimensioned, positioned, and/or oriented to deflect the beam toward a beam output path. The beams from the concentrators are converted to heat at a receiver, and the heat may be temporarily stored or directly used to generate electricity.

41 Claims, 17 Drawing Sheets

(51) Int. Cl.
| | |
|---|---|
| F24J 2/13 | (2006.01) |
| F24J 2/16 | (2006.01) |
| F24J 2/18 | (2006.01) |
| F24J 2/54 | (2006.01) |
| F24J 2/15 | (2006.01) |
| F24J 2/38 | (2014.01) |
| F24J 2/14 | (2006.01) |
| F03G 6/06 | (2006.01) |

(52) U.S. Cl.
CPC .. *F24J 2/13* (2013.01); *F24J 2/14* (2013.01); *F24J 2/15* (2013.01); *F24J 2/18* (2013.01); *F24J 2/38* (2013.01); *F24J 2/12* (2013.01); *F24J 2/16* (2013.01); *F24J 2002/1004* (2013.01); *F24J 2002/108* (2013.01); *F24J 2002/109* (2013.01); *F24J 2002/1019* (2013.01); *F24J 2002/1023* (2013.01); *F24J 2002/1061* (2013.01); *F24J 2002/1076* (2013.01); *F24J 2002/1085* (2013.01); *Y02E 10/46* (2013.01); *Y02E 10/47* (2013.01)

(56) References Cited

U.S. PATENT DOCUMENTS

| | | | | |
|---|---|---|---|---|
| 4,452,047 | A * | 6/1984 | Hunt et al. | 60/641.15 |
| 4,720,170 | A * | 1/1988 | Learn, Jr. | 359/597 |
| 5,529,054 | A * | 6/1996 | Shoen | F24J 2/07 126/600 |
| 6,899,097 | B1 * | 5/2005 | Mecham | 126/591 |
| 7,685,820 | B2 * | 3/2010 | Litwin et al. | 60/641.11 |
| 2007/0137640 | A1 | 6/2007 | Tarabishi | |
| 2008/0087276 | A1 * | 4/2008 | Zhao | 126/683 |

OTHER PUBLICATIONS

PCT International Search Report and Written Opinion for PCT/US2012/028634, dated Oct. 23, 2012, 8 pages.

Berg, Rolf W. et al.; "The NaNO₃/KNO₃ system: the position of the solidus and sub-solidus"; The Royal Society of Chemistry; 2004; pp. 2224-2229 (6pp.).

Bockris, J. O'M et al.; "The Compressibilites, Free Volumes and Equation of State for Molten Electrolytes: Some Alkali Halides and Nitrates"; Proceedings of the Royal Society; Mathematical, Physical & Engineering Sciences; vol. 241; 1957; pp. 44-66 (24pp.).

Dimotakis, Paul E.; "Global Change and Energy: A Path Forward"; Engineering & Science; vol. LXXI, No. 4, Winter 2008; pp. 12-19.

Dostal, V. et al.; "A Supercritical Carbon Dioxide Cycle for Next Generation Nuclear Reactors"; Advanced Nuclear Power Technology Program; Mar. 10, 2004; 326pp.

Falcone, Patricia Kuntz; "A Handbook for Solar Central Receiver Design"; Sandia National Laboratories Livermore; Dec. 1986; 275pp.

Fischer, Paul et al.; "Large Eddy Simulation of Wire-Wrapped Fuel Pins I: Hydrodynamics in a Periodic Array"; Joint International Topical Meeting on Mathematics & Computation and Supercomputing in Nuclear Applications; Apr. 15-19, 2007; 5pp.

Forsberg, Charles; "Concentrated Solar Power on Demand: CSPond: Solar Harvesting and Storage"; Presentation, Dept. of Nuclear Science & Engineering, MIT; Nov. 2011; 43pp.

Kamimoto, Masayuki; "Thermodynamic Properties of 50 Mole% NaNO₃-50% KNO₃ (HTS₂)"; Thermochimica Acta; vol. 49; 1981; pp. 319-331 (13pp.).

Kanellos, Michael; "BrightSource Energy signs whopper solar contract with PG&E";CNET News; http://news.cnet.com/8301-11128_3-9907089-54.html; Mar. 31, 2008; 5pp.

Kreith, F. et al.; "Handbook of Energy Efficiency and Renewable Energy: Preface and Table of Contents"; Mechanical Engineering Series; CRC Press; 2007; 26pp.

Kreith, F. et al.; "Handbook of Energy Efficiency and Renewable Energy: Chapter 21:Concentrating Solar Thermal Power"; Mechanical Engineering Series; CRC Press; 2007; 98pp.

Lamonica, Martin; "BrightSource plans third giant solar-power plant"; CNET News; http://news.cnet.com/8301-11128_320120621-54/brightsource-plans-third-giant-solar-plant/; Oct. 14, 2011; 5pp.

Lamonica, Martin; "Solar dish maker Stirling files for bankruptcy"; CNET News; Green Tech; Sep. 30, 2011; 2pp.

Mackay, David J.C.; "Sustainable Energy—without the hot air"; Synopsis; Full book available at www.withouthotair.com; 2008; 10pp.

National Academy of Sciences; "Electricity from Renewable Resources: Status, Prospects, and Impediments. America's Energy Future Panel on Electricity from Renewable Resources"; The National Academy Press; 2010; accessible at http://www.nap.edu/catalog.php?record_id=12619; 386pp.

Ortega, J. Ignacio et al.; "Central Receiver System Solar Power Plant Using Molten Salt as Heat Transfer Fluid"; Journal of Solar Energy Engineering; May 2008; vol. 130; 6pp.

Ranjan, R. et al.; "Direct simulation of turbulent heat transfer in swept flow over a wire in a channel"; International Journal of Heat and Mass Transfer; vol. 54; 2011; pp. 4636-4654 (20pp.).

Rogers, Derek J. et al.; "Melting-Crystallization and Premelting Properties of NaNO₃/KNO₃. Enthalpies and Heat Capacities"; J. Chem. Eng. Data; 1982; vol. 27, pp. 424-428 (5pp.).

U.S. Department of Energy; "Multi Year Program Plan 2008-2012" Solar Energy Technologies Program; Apr. 15, 2008; 125pp.

U.S. Department of Energy; "Report on the First Quadrennial Technology Review"; Sep. 2011; 168pp.

Wang, Mimi et al.; "Durable Concentrating Solar Power (CSP) Mirrors"; Guardian Indus. Corp.; 2009; Article 1496; 5pp.

* cited by examiner

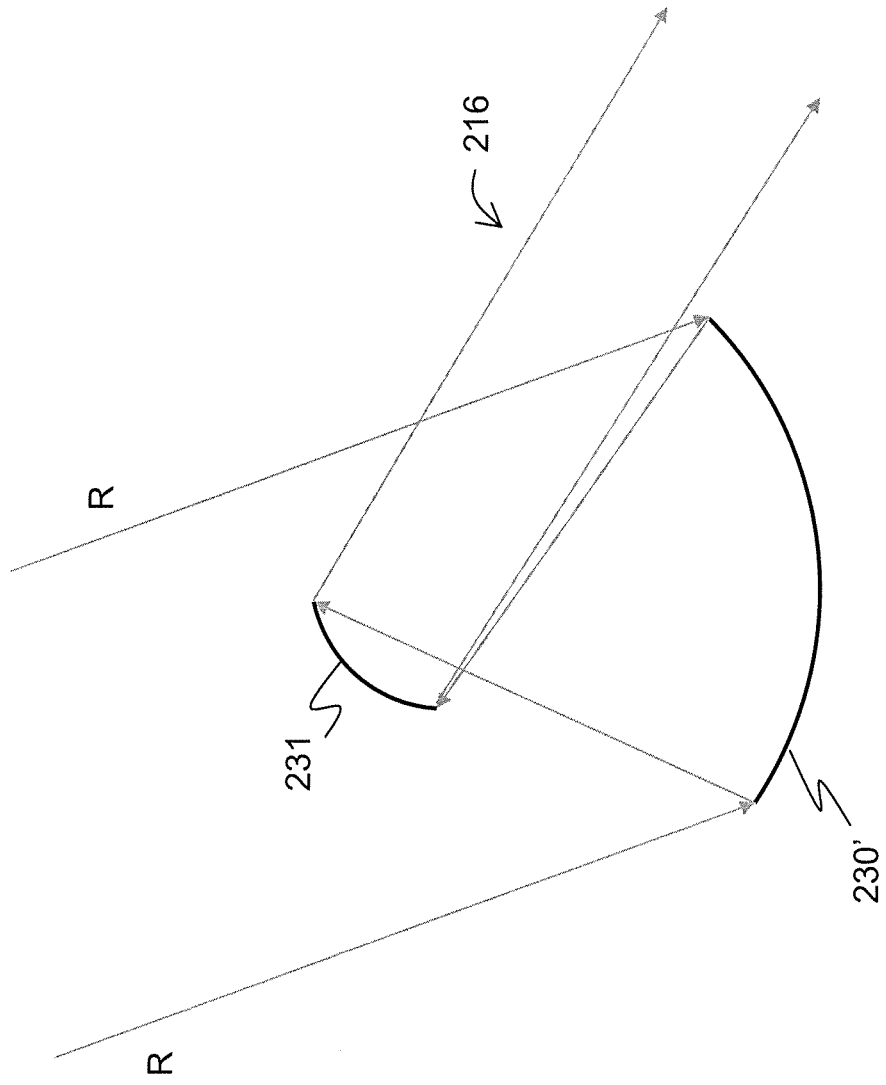

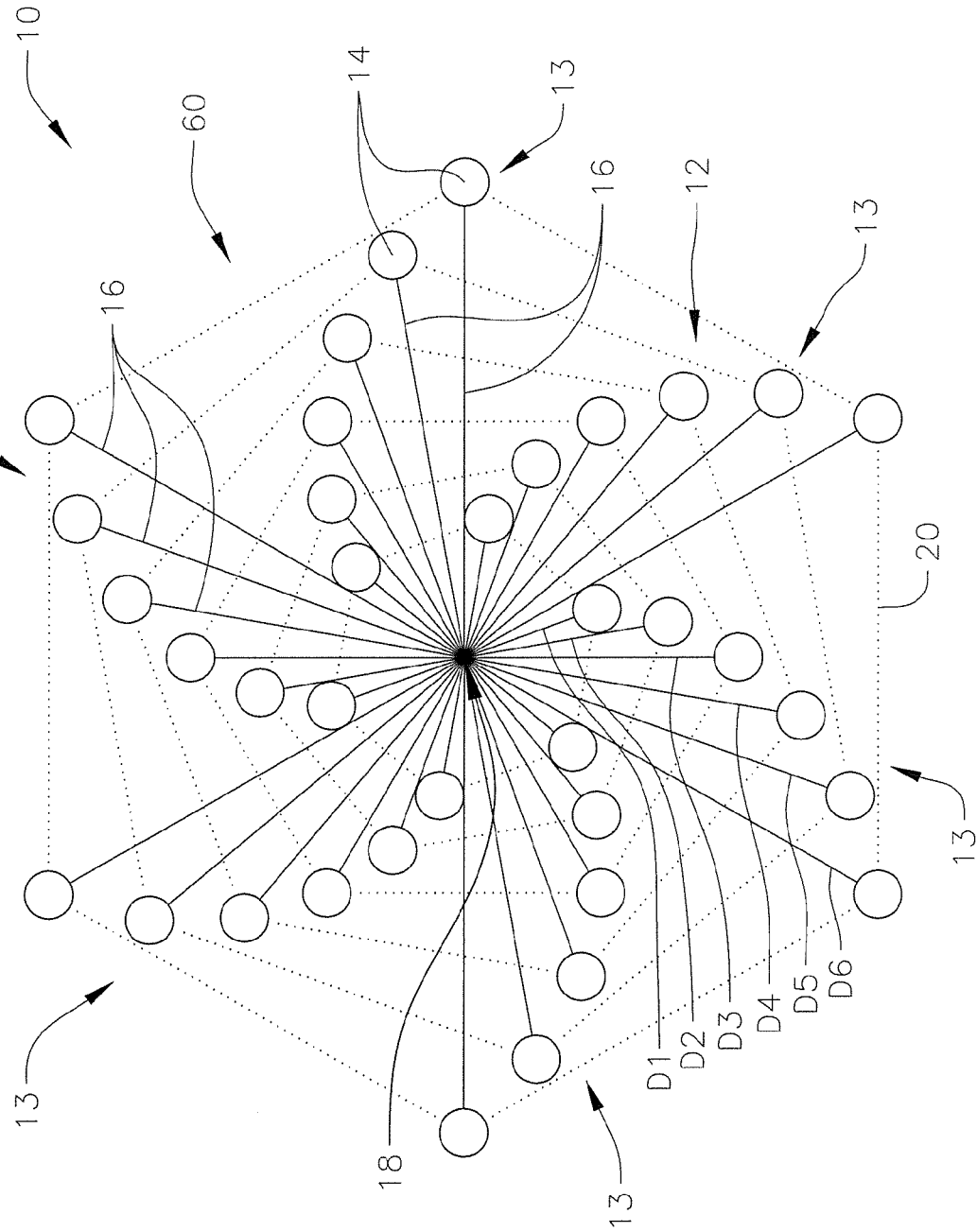

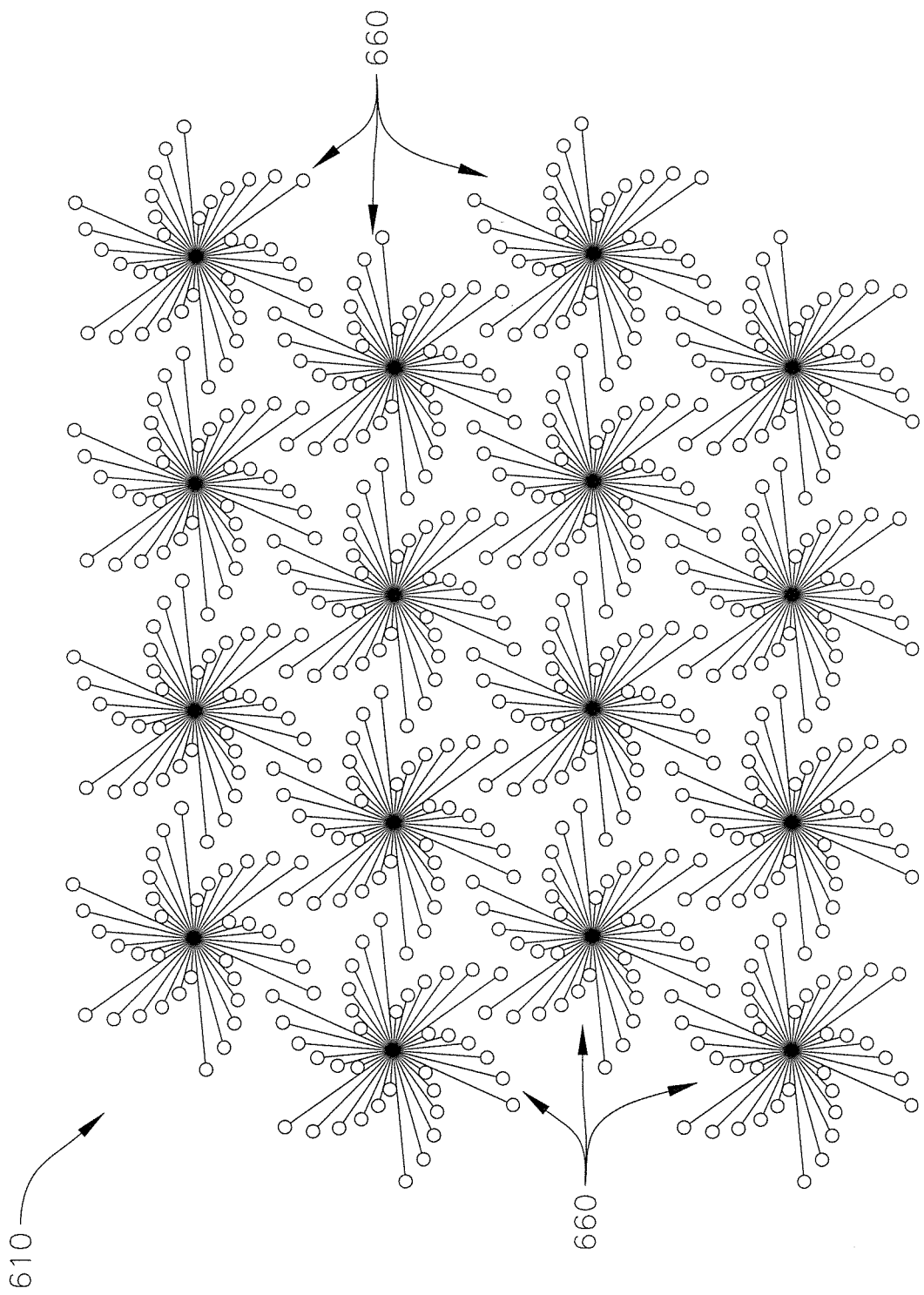

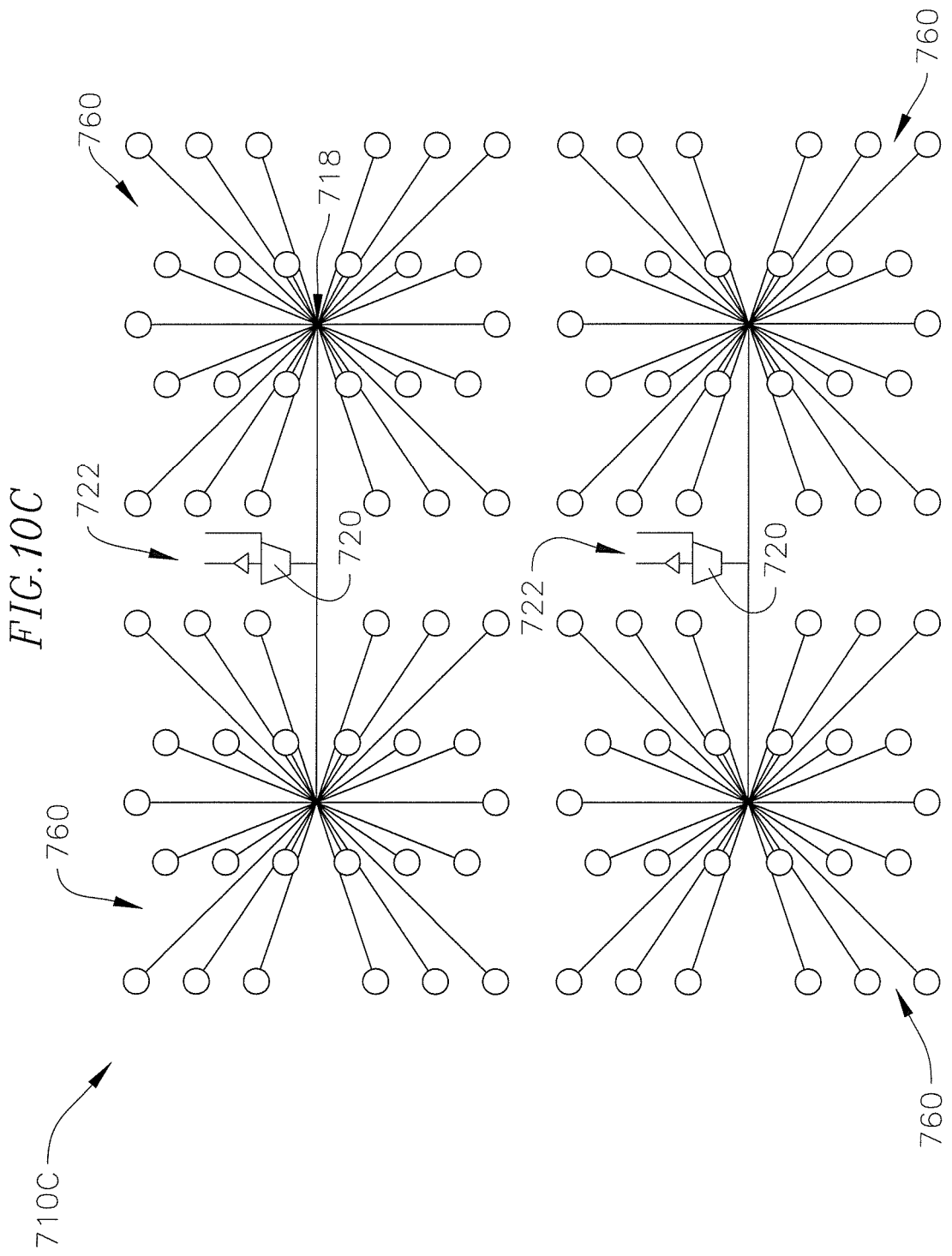

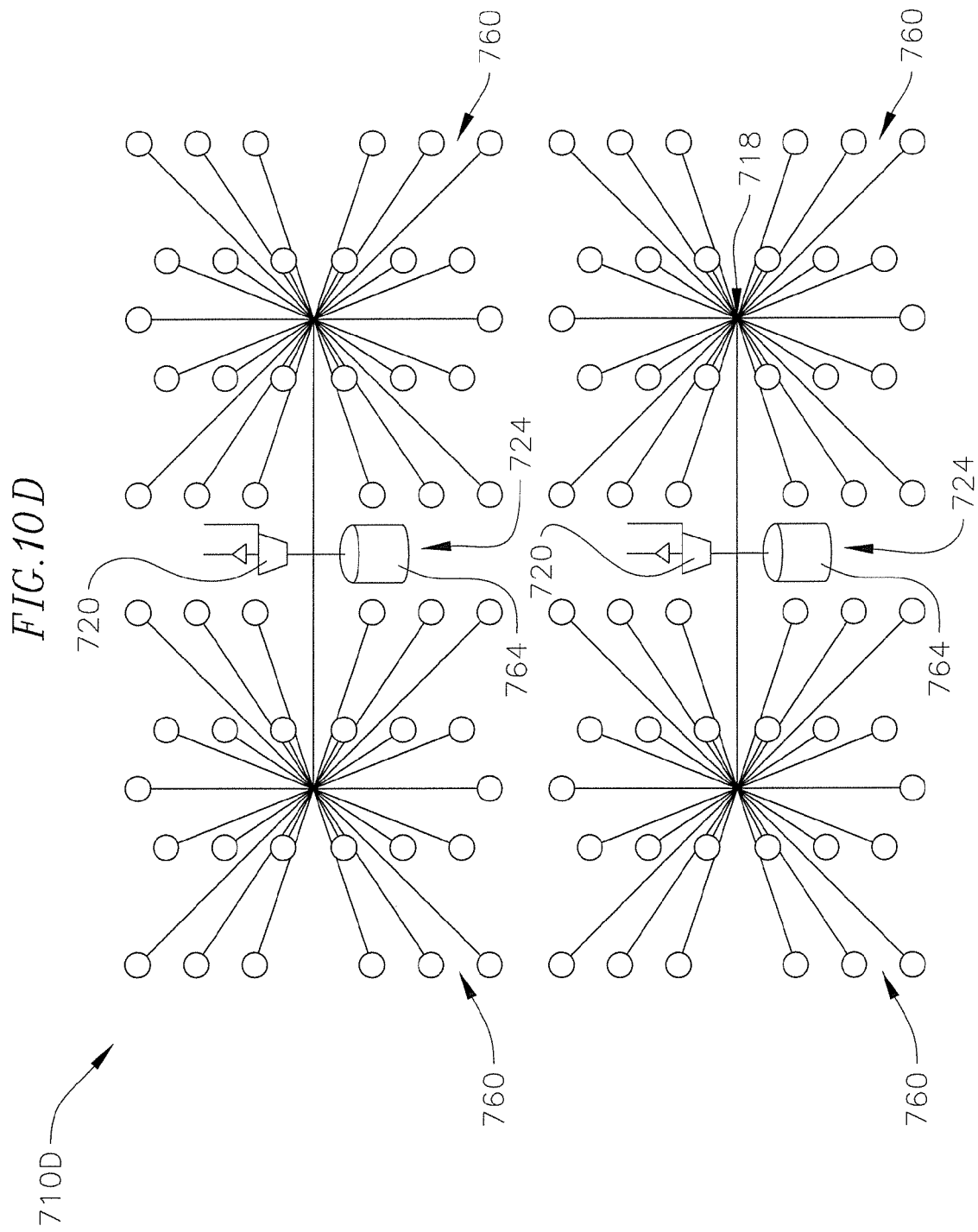

BEAM-FORMING CONCENTRATING SOLAR THERMAL ARRAY POWER SYSTEMS

CROSS-REFERENCE TO RELATED APPLICATION(S)

This Patent Application claims the benefits of U.S. Provisional Patent Application Ser. No. 61/450,928, filed on Mar. 9, 2011, and U.S. Provisional Patent Application No. 61/593,744, filed on Feb. 1, 2012, the entire contents of both of which are hereby expressly incorporated by reference.

STATEMENT REGARDING FEDERALLY SPONSORED RESEARCH OR DEVELOPMENT

The invention described herein was made in the performance of work under a NASA contract, in part, and is subject to the provisions of Public Law 96-517 (35 USC 202) in which the Contractor has elected to retain title.

FIELD

The present invention relates to concentrating solar power systems and, more particularly, beam-forming concentrating solar thermal array power systems.

BACKGROUND

Solar power systems offer much promise for clean energy, with few, or zero, carbon emissions. These systems collect incident sunlight and convert this sunlight into a usable form of power, such as electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced, for a lower levelized cost of energy. An important metric is the overall system efficiency, that is, the electric power output per incident solar power collected.

Solar power systems include photovoltaic systems, solar thermal systems, and others. Photovoltaic systems utilize photovoltaic solar cells that convert sunlight directly into electricity by the photovoltaic effect. These solar cells are expensive, and their efficiencies are limited because they can exploit only a portion of the solar spectrum. These systems are also characterized by a large energy-payback period, i.e., the time they must be exposed to sunlight and produce electricity, to return the energy required to produce and install them.

Solar thermal systems convert sunlight into heat and use this heat to generate electricity. Examples of solar thermal systems include solar power towers, parabolic trough systems, and dish-Stirling systems. Solar power towers utilize a large number of steerable, planar, or near-planar mirrors that reflect and direct rays of sunlight to a central tower where a heat-transfer fluid is heated. The heat collected is typically transferred to rotating machinery, such as a steam turbine, that is used to drive an electric generator. These systems suffer from low efficiencies because of high optical losses, such as cosine and other optical losses, solar-receiver losses, as well as temperature and power losses from long fluid-flow loops to and from the tower. Cosine losses refer to the energy lost when light rays from the sun do not strike the mirror perpendicular to its surface. To reflect rays of sunlight to the central tower, individual mirrors form an acute angle to the sun, therefore requiring more mirror surface than when the mirror is perpendicular to the sun's rays. Collection efficiency is increased and mirror cost is less when the mirror is perpendicular to the sun.

Parabolic-trough systems utilize elongated cylindrical mirrors to heat a thermal fluid that is pumped through a pipe positioned on the focal line of each mirror. These systems are characterized by low thermal efficiencies because the operating temperature of the circulating thermal fluid is limited to avoid its decomposition. Additionally, these systems pay efficiency penalties because of the pumping power required to circulate the hot fluid around the field, and they suffer heat losses because the hot fluid circulates over long distances to cover the collector field before it can be used to heat the working fluid (typically steam) of the turbine-driven electric generator that produces electric power. Heat is lost through dissipation along these long flow distances.

Dish-Stirling systems utilize axisymmetric parabolic solar collectors, where each individual collector has its own power converter unit that generates electric power (e.g., a Stirling engine) supported at the focal point of the dish collector. While this system offers higher collection and conversion efficiency, it requires a very large number of individual engines to drive electric generators. Secondly, a complex and heavy structural mounting system is required to suspend the heavy generator at each collector's focus. Additionally, dish-Stirling systems are typically designed to produce power directly because it is difficult to adapt them to exploit thermal-energy storage to tailor their power-production profile to better match the desired power-demand profile, average output during cloud cover, and for other reasons, such as optimizing revenue according to terms specified in the electricity-generating plant power purchasing agreement with the electric grid utility.

A further issue in dish-Stirling solar-thermal systems is the inability to output power at levels required to operate turbines and other high-efficiency and high-reliability electric generators at optimum levels. As a result, dish-Stirling systems use reciprocating piston machinery characterized by high operational and maintenance costs.

Accordingly, there remains a need for concentrating solar power systems with thermal-energy storage options, capable of grid-scale electric-power output, high system efficiency, and low levelized cost of energy.

SUMMARY

The present invention relates to solar power systems and more particularly beam-foaming concentrating solar thermal power array systems. In one embodiment, a solar power system includes an array of solar concentrators. Each solar concentrator collects incident rays of sunlight and concentrates the rays to form a concentrated solar beam with a desired concentration factor. In one embodiment, the solar concentrator includes a parabolic dish which collects the solar rays, a beam-forming mirror which concentrates the collected rays into a beam, and one or more mirrors that steer and may further form the beam with minimal optical losses along the desired output path. Each solar concentrator directs the beam toward a central receiver, which receives beams from concentrators in the array. The solar power from the concentrated solar beams is converted into heat at the receiver. This heat is either temporarily stored in a heat-storage medium, such as a molten-salt solution, or used directly to drive an electric generator to produce electricity.

When the heat is temporarily stored, a heat exchanger is employed to heat the working fluid of a turbine that drives the electric generator, for example, so that electricity can be generated after the solar energy is collected, such as after peak solar power or even after sunset, or to supply heat when clouds may temporarily limit incident solar radiation. The use of concentrated, steered solar beams enables the system to operate with increased efficiency, using highly-reliable rotating-machinery power-conversion units, such as turbines. Electric power generated in this manner can then be combined to provide grid-scale power output at increased efficiency and lower cost.

In one embodiment, a solar concentrator is provided for concentrating incoming sunlight into a beam. The solar concentrator includes a solar collector, a beam-forming element, and a steering element. The solar collector is dimensioned to collect and divert incoming rays of sunlight. The beam-forming element intercepts the diverted rays of sunlight, and is shaped and dimensioned to concentrate the rays of sunlight into a beam. The steering element is positioned, dimensioned, and shaped to deflect the beam toward a beam output path.

In one embodiment, a solar power system includes a plurality of solar concentrators, which may be referred to as a pod. The pod includes solar concentrators that each form a concentrated solar beam. The solar power system also includes a receiver that receives the concentrated solar beams and converts the solar beams into heat. A power conversion unit is coupled to the receiver to convert the heat into electricity. In one embodiment, multiple pods are provided, and the electricity from each pod is combined and delivered to the utility electric grid.

In one embodiment, a method for generating electricity from sunlight is provided. The method includes collecting sunlight with a plurality of solar collectors, and concentrating the sunlight from each collector into a concentrated solar beam. The concentrated solar beams are then steered from the collectors to a single receiver, where the solar power in the beams is converted into heat. The method also includes converting the heat into electricity with a power conversion unit.

In one embodiment, a solar concentrator includes a plurality of beam-forming optical elements. These elements are arranged to collect incoming solar rays and concentrate the rays into a concentrated solar beam. The solar concentrator also includes a steering element, which is positioned and shaped to steer the beam along a beam output path.

BRIEF DESCRIPTION OF THE DRAWINGS

FIG. 5A is a schematic view of a solar concentrator according to an embodiment of the invention.

FIG. 9A is a schematic view of a solar power system including one pod, according to an embodiment of the invention.

FIG. 9B is a schematic view of a solar power system including sixteen pods, according to an embodiment of the invention.

FIGS. 10A-10E depict schematic views of solar power systems in various pod arrangements, according to embodiments of the invention.

DETAILED DESCRIPTION

The present invention relates to solar power systems and more particularly beam-forming concentrating solar power arrays. In one embodiment, a solar power system includes an array of solar concentrators. Each solar concentrator collects incident rays of sunlight and concentrates the rays into a concentrated solar beam. In one embodiment, the solar concentrator includes a parabolic dish that collects the solar rays, a beam-forming mirror that concentrates the collected rays into a beam, and one or more steering mirrors directing the beam along a desired output path. Each solar concentrator assembly produces and directs a beam toward a central receiver that receives the beams from the concentrators in the array. The concentrated beams are converted into heat at the receiver, and this heat is used to drive a generator to produce electricity. Optionally, the heat may be temporarily stored prior to driving the generator, so that electricity can be generated after it is collected, such as after sunset. The use of concentrated, steered solar beams enables the system to operate with increased efficiency and to provide grid-scale power output at a reduced cost.

As used herein, a "ray" of sunlight refers to an unconcentrated ray of natural light from the sun, and a "beam" refers to a concentrated collection of rays along a path. A beam is produced by concentrating rays of sunlight by a desired concentration factor. The concentration factor of an individual beam is the ratio of the area of collected sunlight to the cross-sectional area of the beam at the end of its path. In one embodiment, a beam according to the invention has a concentration factor of approximately 100. A beam may be parallel, converging, or diverging. A beam is formed by the concentration of rays, rather than simply by the specular reflection of rays.

As used herein, the term "deflector" refers to reflective elements, refractive elements, and other optical elements that divert light.

In one embodiment, the total concentration factor on the receiver surface is higher than the concentration factor of individual beams, by superimposing more than one beam in the same area on the receiver surface. Total concentration factors of 300, or more, can be achieved, leading to high design temperatures at the receiver, if desired.

Figure 1:
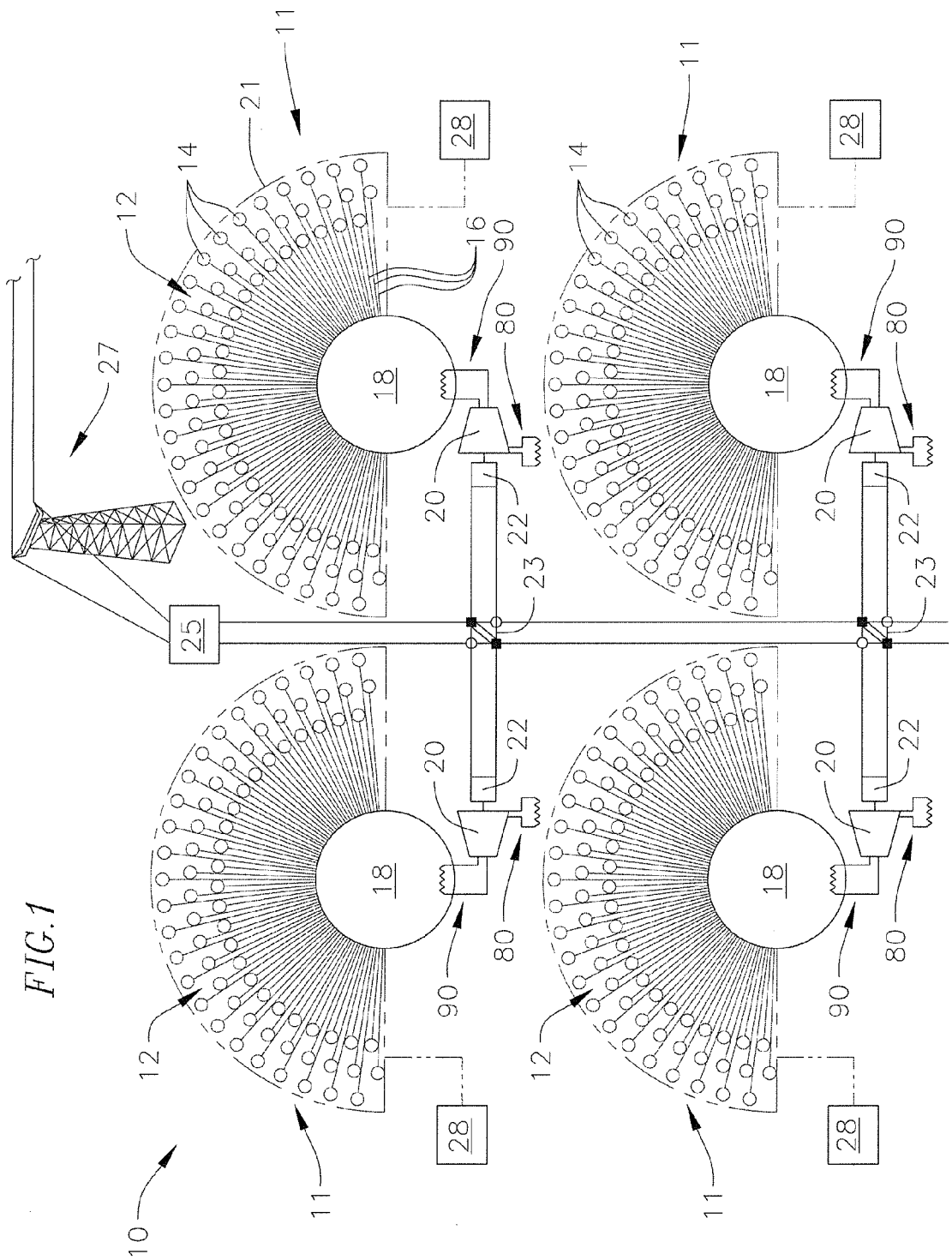
FIG. 1 is a schematic view of a solar power system according to an embodiment of the invention.
Figure 2:
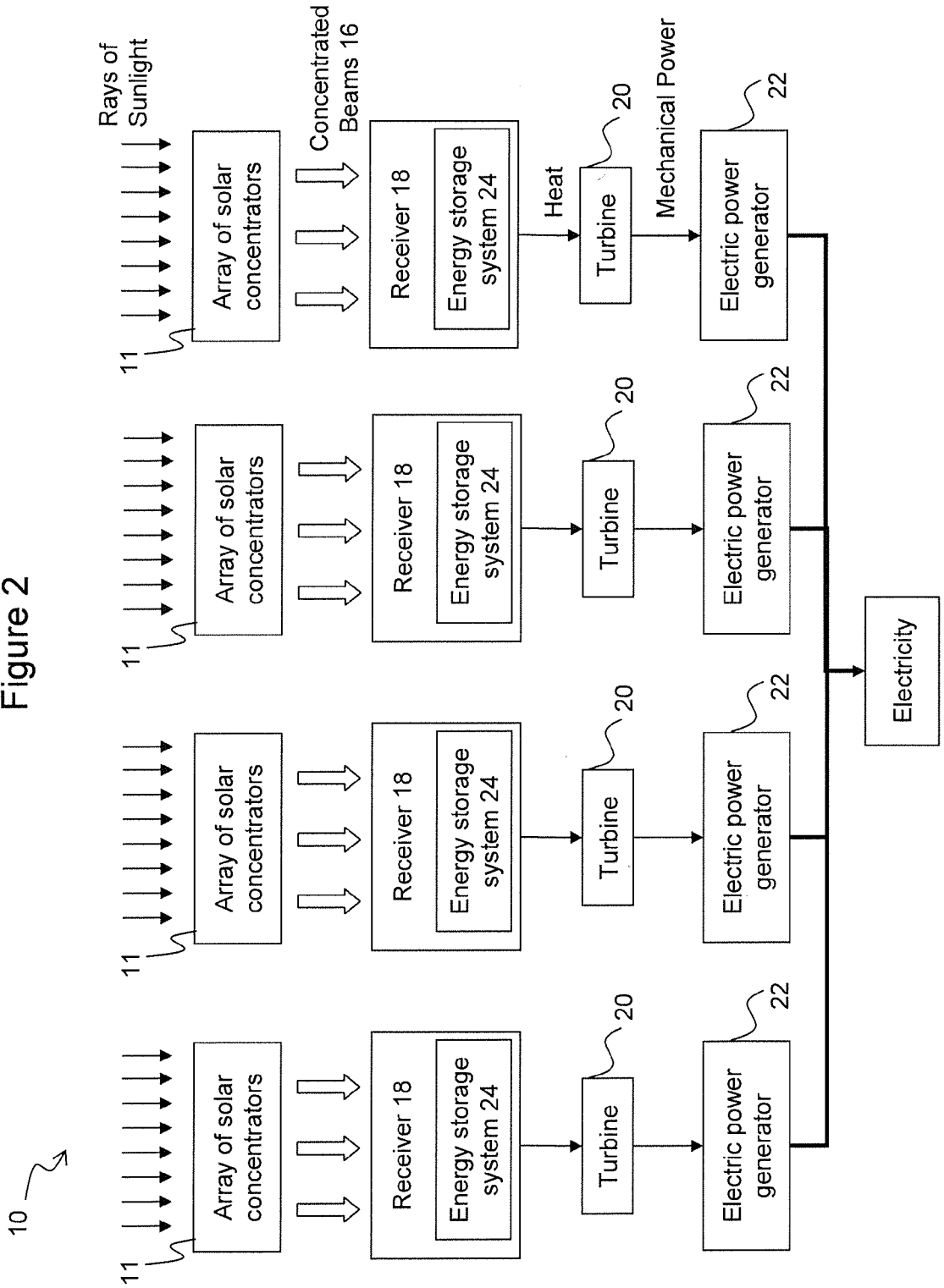
FIG. 2 is a schematic view of a solar power system according to an embodiment of the invention.

A solar power system 10 according to an embodiment of the invention is shown schematically in FIGS. 1 and 2. The solar power system 10 is made up of several groups or pods 11. Each pod 11 includes an array 12 of solar concentrators 14, each forming a beam 16 of concentrated sunlight, directed to a central receiver 18. The solar concentrators 14 are arranged within a collecting field 21 such that each concentrator 14 is within line of sight to the receiver 18, to steer the beam 16 toward the receiver 18. At the receiver, the solar energy in the beam is converted to heat. In one embodiment, the receiver 18 is integrated with an energy storage system 24, which enables the heat to be stored for later use. The receiver 18 includes a thermal storage medium, such as molten salt stored within an insulated thermal tank. The beams 16 converge on the receiver 18 to heat the thermal storage medium inside the receiver, in this embodiment. When power output from the solar energy system 10 is needed, heat is drawn from the receiver 18 and is used to drive a turbine 20, which is connected to an electric generator 22. The output from each generator 22 is schematically shown to be connected to bus bars running between the pods 11, combining the electric power generated by each pod 11, through power-conditioning circuitry 23 at each junction. The circuitry 23 bridges the turbine output with the electric power lines. The voltage of the combined power is then further conditioned, typically driving a step-up transformer 25 to match the grid voltage, as required to contribute power to the utility electric grid 27. While four pods 11 are shown together in FIG. 1, a solar power system 10 may include fewer or many more pods, with the combined power output of all pods being delivered to the electric grid 27. It will be appreciated that the components of FIG. 1 are illustrated for clarity and are not shown to scale.

Figure 3:
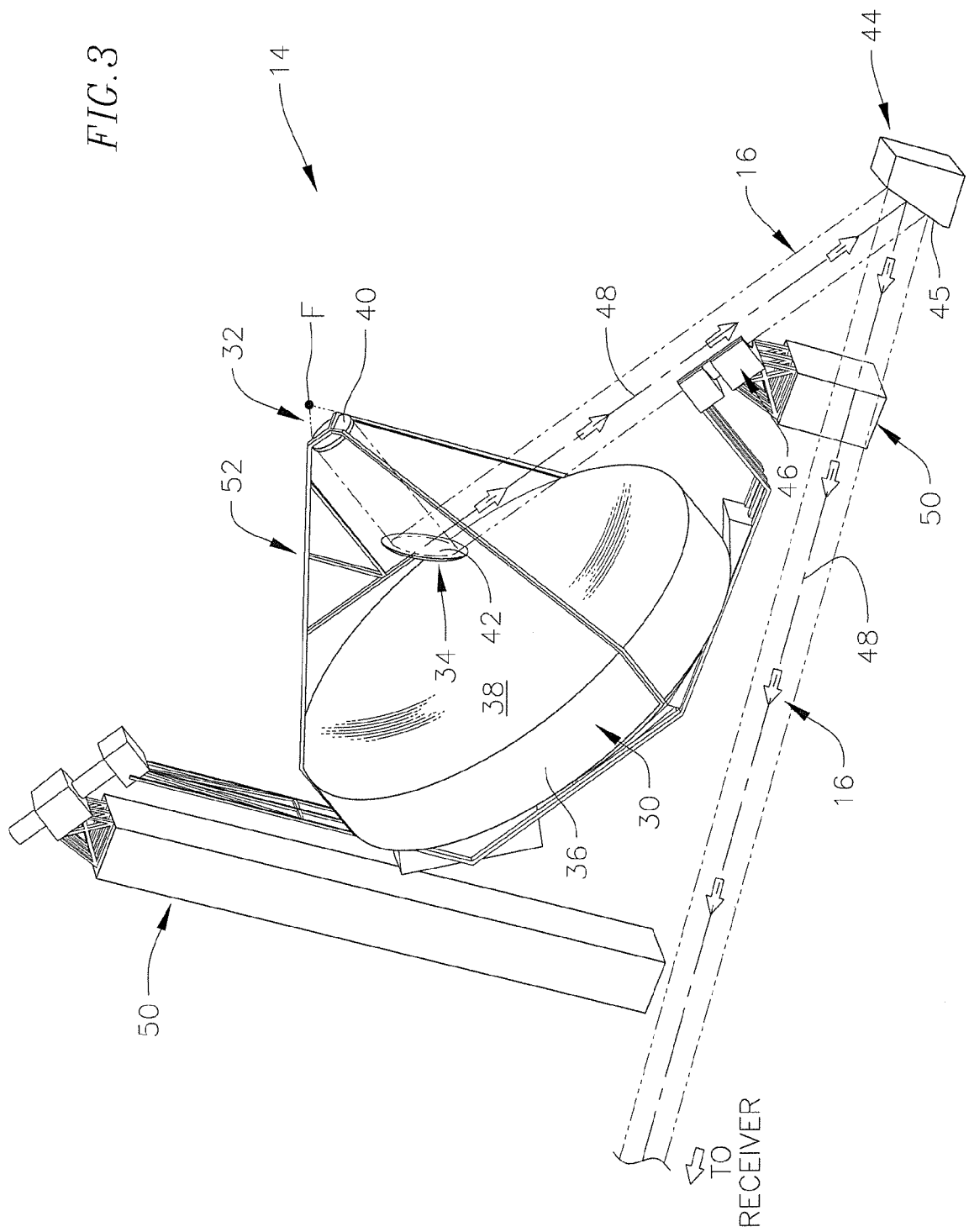
FIG. 3 is a perspective view of a solar concentrator according to an embodiment of the invention.
Figure 4:
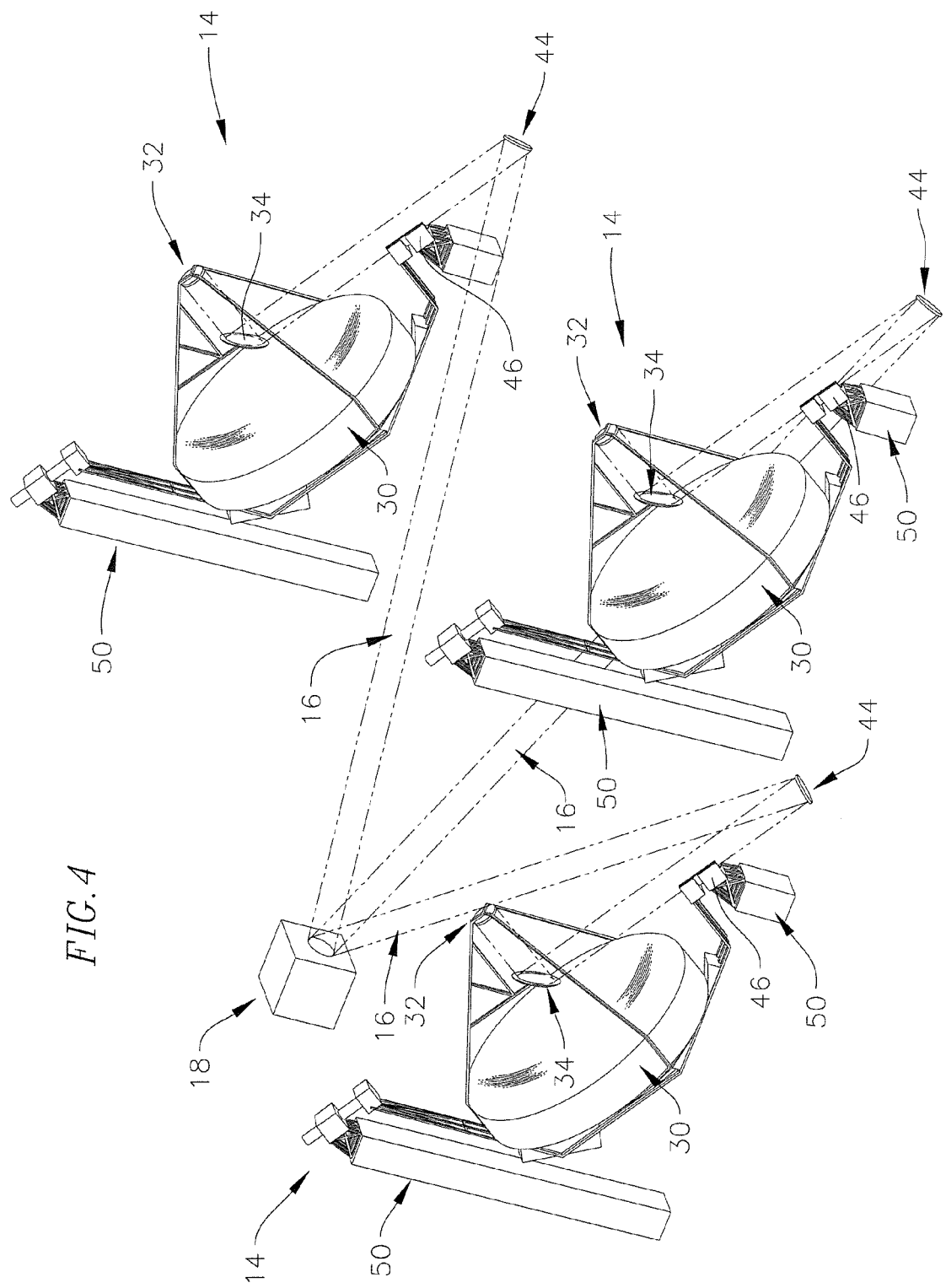
FIG. 4 is a perspective view of a group of solar concentrators directing solar beams to a receiver, according to an embodiment of the invention.

Each pod 11 includes an array of solar concentrators 14. A single solar concentrator 14 according to an embodiment of the invention is shown in FIG. 3, and a collection of three concentrators 14 directing concentrated solar beams 16 to a receiver 18 is shown in FIG. 4. It will be appreciated that a single pod 11 may include more than three concentrators 14, and that FIG. 4 shows only three concentrators for clarity. The solar concentrator 14 includes an arrangement of beam-forming optical deflectors that direct incoming rays of sunlight to form a concentrated beam. Each concentrator uses a combination of optical deflectors to collect sunlight, concentrate the sunlight into a beam, and steer the beam toward the receiver. In one embodiment, the optical deflectors are reflecting elements or reflectors, such as mirrors or other reflecting surfaces or optics. In one embodiment, the optical deflectors include a combination of converging and diverging optics to form, shape, and steer the beam.

In one embodiment, the optical deflectors include a solar collector 30, a beam-forming element 32, and at least one steering element 34. In one embodiment, the solar collector 30 includes a collecting dish 36 with a reflective surface 38. The collecting dish 36 may be a concave, paraboloid (or parabolic) mirror with a focal point F (shown in FIG. 5). The collector 30 collects incoming rays of sunlight and diverts them toward the focal point F. The rays converge toward the focal point. The beam-forming element 32 is positioned above the dish 36, between the reflective surface 38 and the focal point F. The beam-forming element 32 intercepts the converging rays and re-focuses them into a concentrated beam 16. The steering element 34 is positioned in the path of the beam 16, to divert the beam into an output path 48 (FIG. 3) that is steered toward the receiver (not shown in FIG. 3). It is noted that the focal point F is the focal point of the collector, but that incoming light is not necessarily focused to a single point at F, depending on the characteristics of the incoming light. For example, incoming rays of sunlight are not focused to a single point because of the finite angular extent of the sun.

In one embodiment, the beam-forming element 32 is a convex mirror or reflective surface 40 with a virtual focus at (or near) the same point F as the focal point F of the dish 36. The distance between the two foci is used to control convergence of the beam. The mirror 40 inverts the focusing arrangement of the parabolic dish 36. In doing so, the mirror 40 acts as a de-focusing element and prevents the rays from further converging. The mirror 40 converts the converging rays into a concentrated beam 16. The size, shape, and position of the mirror 40, along with other mirrors in the beam's path, determine the concentration factor of the beam 16 (for a given beam length). The virtual focus of the mirror 40 may be located at the focal point F of the dish, or in front of or behind the focal point F. The location of the mirror 40 and its curvature affects the shape of the resulting beam. The beam may be parallel (collimated), converging, or diverging. Forming a beam 16 that slowly diverges or converges can be useful, as described further below. In one embodiment, the mirror 40 is located in front of the focal point F (between the collector and the focal point F), and is convex. In one embodiment, the mirror 40 is located behind the focal point F (with the focal point F between the collector and the mirror 40), and the mirror 40 is concave. When the mirror is concave, the reflecting surface is partially shielded from environmental exposure, such as wind, dust, and debris, as compared to a convex mirror. The positioning of the mirror 40 in front of or behind the focal point F may also be adjusted to position the center of gravity of the system.

According to embodiments of the invention, the beam-forming element 32 is offset from the focal point F of the collector 30. In FIGS. 3 and 4, the beam-forming element 32 includes a convex surface positioned between the collector 30 and its focal point F. This system may be referred to as a Cassegrain optical system. In other embodiments, the focal point F is positioned between the collector 30 and the beam-forming element 32, and the beam-forming element includes a concave surface. This system may be referred to as a Gregorian optical system.

The mirror 40 reflects the beam 16 back in the direction of dish 36. The beam is intercepted by the steering element 34. In one embodiment, the steering element 34 is a planar or flat mirror or reflective surface 42. The mirror 42 reflects the beam and diverts it onto the beam output path 48, which sends the beam toward the receiver 18. As shown in FIG. 4, in one embodiment, each concentrator 14 also includes a fixed steering element 44 downstream (in terms of the beam path) of the first steering element 34. In one embodiment, the fixed steering element 44 includes a flat mirror 45 that steers the beam 16 toward the receiver 18. The orientation of the mirror 45 depends on the position of the concentrator 14 with respect to the receiver 18 (i.e., the position of the concentrator 14 within the array 12, shown in FIG. 1). The steering elements provide a system of relay optics for sending the beams to the receiver. The receiver 18 receives the beams 16 from each of the concentrators 14 in the array 12.

In one embodiment, the concentrator 14 includes a guide or shield for the beam 16. The guide can shield the beam 16 from the surrounding environment, as may be used to reduce environmental effects on the beam (such as scattering and attenuation through the atmosphere) and to protect operators or technicians from entering the beam's path 48. In one embodiment the shield fully encapsulates the beam 16 and extends along the entire path 48 of the beam to the receiver 18. In one embodiment, the beams 16 are near ground level but are elevated by a few feet for safety. Additionally, in one embodiment, a safety system may be provided to rotate the concentrators away from the sun if a perimeter fence is breached or motion is detected within the field. The measures listed above are listed and may be implemented to provide additional safety measures. Routine operations and maintenance activities would be undertaken during dusk hours after sunset, or even under artificial lighting at night.

Referring still to FIGS. 3 and 4, the solar concentrator 14 also includes a frame 50. The frame 50 supports the collector 30 as well as the beam-forming element 32, steering element 34, and optionally, a portion of the shield 46. The support frame 50 includes a central frame 52 extending over the dish 36 to suspend the beam-forming element 32 and the steering element 34 above the dish 36. The frame 50 orients the dish 38 at an angle α (see FIG. 5) above the horizon, in order to point the dish toward the sun. The angle α is approximately equal to the latitude of the location where the dish is installed. In one embodiment, the frame 50 includes a light-weight truss structure.

Figure 5:
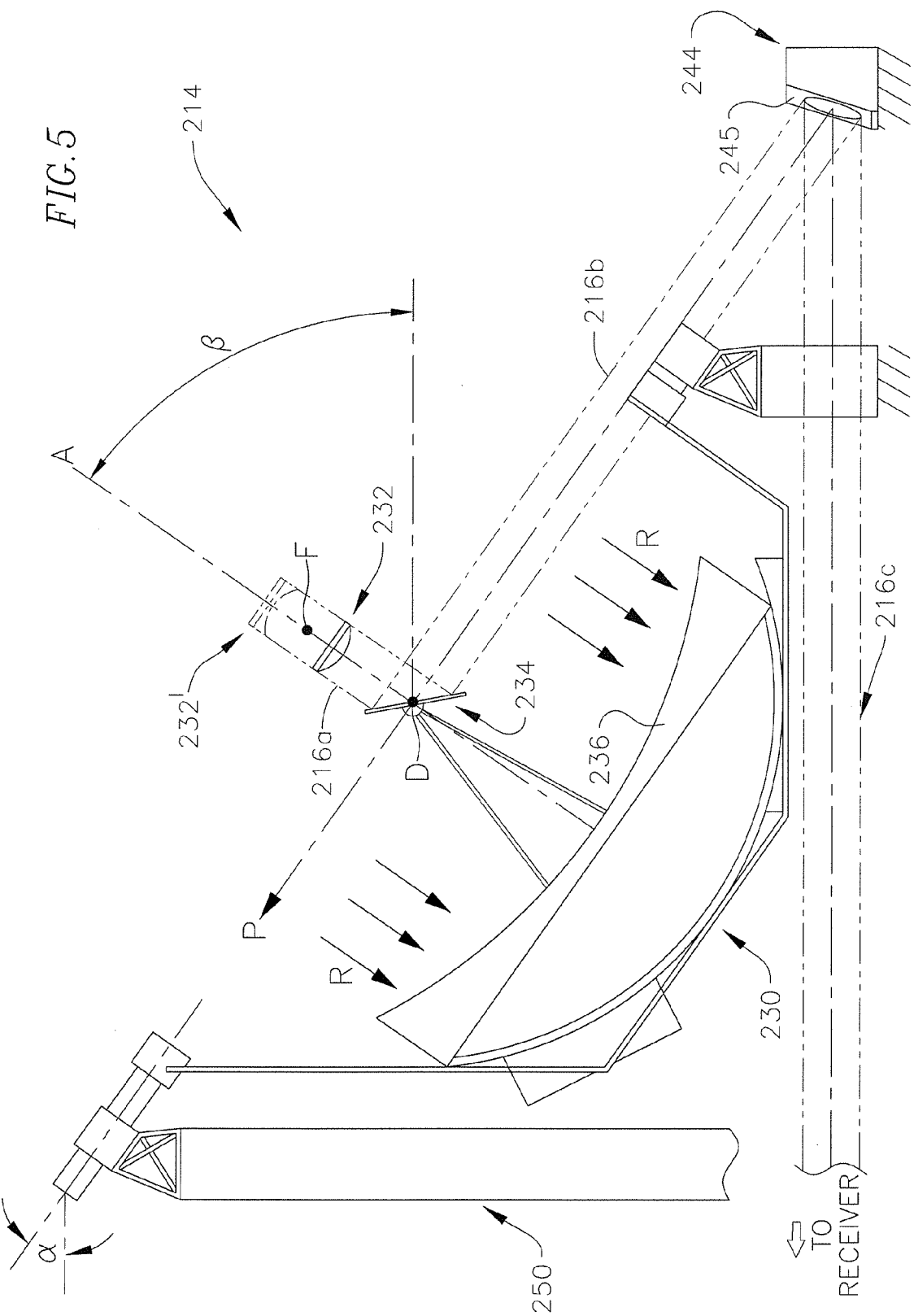
FIG. 5 is a side view of a solar concentrator according to an embodiment of the invention.

In one embodiment, the solar concentrator is configured to steer the beam along the same output path 48 (toward the receiver) even as the concentrator moves to track the sun during the day and to adjust for seasonal changes in the sun's elevation during the year. Such a solar concentrator 214 is shown in FIG. 5. The concentrator 214 includes a collector 230 including a parabolic dish reflector 236 with a focal point F. The parabolic dish 236 has a central axis A passing through its focal point F.

The dish 236 is rotated about two axes in order to track the sun through the day and year. First, incrementally through the year, the dish 236 is rotated about axis D to adjust the declination β of the dish (the angle between the axis A and the horizon). This adjustment is made in order to track seasonal changes in the sun's elevation (i.e., higher in summer and lower in winter). The axis D may be referred to as the declination axis, as rotation of the dish 236 about this axis adjusts the declination β of the dish 236.

Second, during each day, the dish 236 is rotated about polar axis P to track the sun across the sky. In order to track the sun across the sky each day, the axis P of rotation of the dish 236 is pointed toward the Earth's North Pole. As the Earth rotates about the North Pole, the dish 236 rotates about the polar axis P such that the axis A of the dish is pointed at the sun throughout the day, tracking the sun as it moves across the sky. Thus, by rotating about axes P and D throughout the day and year, the dish 236 can be oriented to always point toward the sun (when the sun is above a minimum elevation above the horizon). Regardless of its orientation, the dish 236 reflects incoming rays of sunlight into rays R converging conically toward the focal point F.

The beam-forming element 232 is fixed with respect to the dish 236, and rotates with the dish about the axes P and D. As a result, the beam-forming element 232 remains positioned between the dish 236 and its focal point F, to intercept the converging rays R and form them into the beam 216. The portion 216a of the beam exiting the beam-forming element 232 extends along the axis A of the dish 236 toward the steering element 234. Beam-forming element 232 is shown in FIG. 5 as a convex optical element positioned in front of the focal point F. As noted above, the beam-forming element may be positioned in front of or behind the focal point F of the collector. To show this option, beam-forming element 232' is shown in FIG. 5 in phantom lines, as a concave optical element positioned behind the focal point F.

As the dish 236 and the beam-forming element 232 rotate about axis P during the day, the beam portion 216a exiting the beam-forming element 232 moves in space, also rotating about axis P. The steering element 234 is positioned to intercept this beam and divert it to the fixed steering element 244. In order to divert the beam in a fixed direction (toward the fixed steering element 244) as the collector 230 rotates, the steering element 234 is positioned at the intersection of the declination axis D and the polar axis P. The steering element 234 is also positioned along axis A of the primary collector 230. The steering element 234 rotates with the collector 230 and beam-forming element 232 about axis P, and counter-rotates about axis D. The counter-rotation about axis D is a movement opposite the collector 230 and beam-forming element 232, to counter-act their rotation and maintain the beam 216 pointed toward the fixed steering element 244. That is, the steering element 234 rotates about axis D but in the opposite direction as the collector 230 and beam-forming element 232. In one embodiment, the steering element 234 rotates half the angular distance (in the opposite direction) as the collector 230 and beam-forming element 232.

The steering element 234 is positioned at the intersection of the daily axis of rotation of the collector (the polar axis P) and the axis of elevation of the collector (the declination axis D). Thus, regardless of the angle that the collector is rotated about axes P and D during the day and year, the steering element 234 is positioned to direct the beam in the same direction. The portion 216b of the beam exiting the steering element 234 is directed along axis P toward fixed element 244. The beam portion 216a moves in space, but the beam portion 216b remains stationary. The steering element 234 throws the beam portion 216b in a fixed direction even as the collector 230 rotates.

The beam portion 216b exits the steering element 234, follows the polar axis P, and intersects the fixed steering element 244. During the day, as the collector 230, beam-forming element 232, and steering element 234 rotate about axis P, and during the year as these components rotate about axis D, the fixed steering element 244 remains stationary. Because the steering element 234 is positioned at the intersection of axes P and D and counter-rotates about axis D to keep the beam portion 216b stationary, the fixed steering element 244 does not need to move. The fixed steering element 244 remains in place and deflects the beam portion 216b into the beam portion 216c, which intersects the stationary receiver (either directly or via additional steering elements). As mentioned above, in one embodiment, the fixed steering element 244 is a flat mirror or reflecting surface 245.

During the year, the declination β of the dish 236 is changed to account for variations in the elevation of the sun in the sky. Over the year, the elevation of the sun varies by 23 degrees. Thus, in one embodiment, the dish 236 can be rotated about the declination axis D once each day, to adjust the angle β to track the elevation of the sun. During each day, the angle β can remain fixed, and the collector 230 rotates about only one axis (axis P) as it tracks the sun. The angle β may be adjusted incrementally, such as once daily, or more or less frequently, or may even be adjusted continuously for greater collection efficiency.

In one embodiment, the concentrator 214 is controlled by an azimuth-elevation system, rather than a polar-declination system. An azimuth-elevation system moves the concentrator about two axes, azimuth and elevation, to track the sun. For example, in one embodiment the concentrator 214 is mounted on a circular track that rotates to adjust azimuth, and the concentrator 214 is coupled to motors that tilt the concentrator up or down with respect to the horizon, to adjust elevation. This combination of movements provides alternate means for the concentrator to track the sun across the sky during the day and throughout the year. Even when an azimuth-elevation tracking system is used, the steering element 234 may be positioned at the intersection of the polar and declination axes of the system, in order to steer the beam along a fixed direction as the concentrator tracks the sun. Thus, the steering element 234 may be positioned at the intersection of the polar and declination axes even when the polar and declination axes are not the axes operated to move the concentrator to track the sun. Furthermore, azimuth-elevation and polar-declination are not the only tracking systems available, and other sun-tracking systems may be used in other embodiments, to orient the concentrator axis toward the sun.

In one embodiment, the rotation of the concentrator to track the sun is controlled by a sun tracking system 28. The sun tracking system includes a controller that is coupled to the concentrators to send commands to move the components of the concentrators to track the sun. In particular, the controller sends commands to motors that are located at each concentrator to rotate the collector, beam-forming element, and steering element as described above to track the sun and steer the beam to the receiver. The collector, beam-forming element, and steering element are supported on the frame 50 (see FIG. 3) by journals or bearings 46 that allow these components to rotate about the appropriate axes. In one embodiment, a single controller is used to control the rotation of all concentrators in the array.

Figure 6:
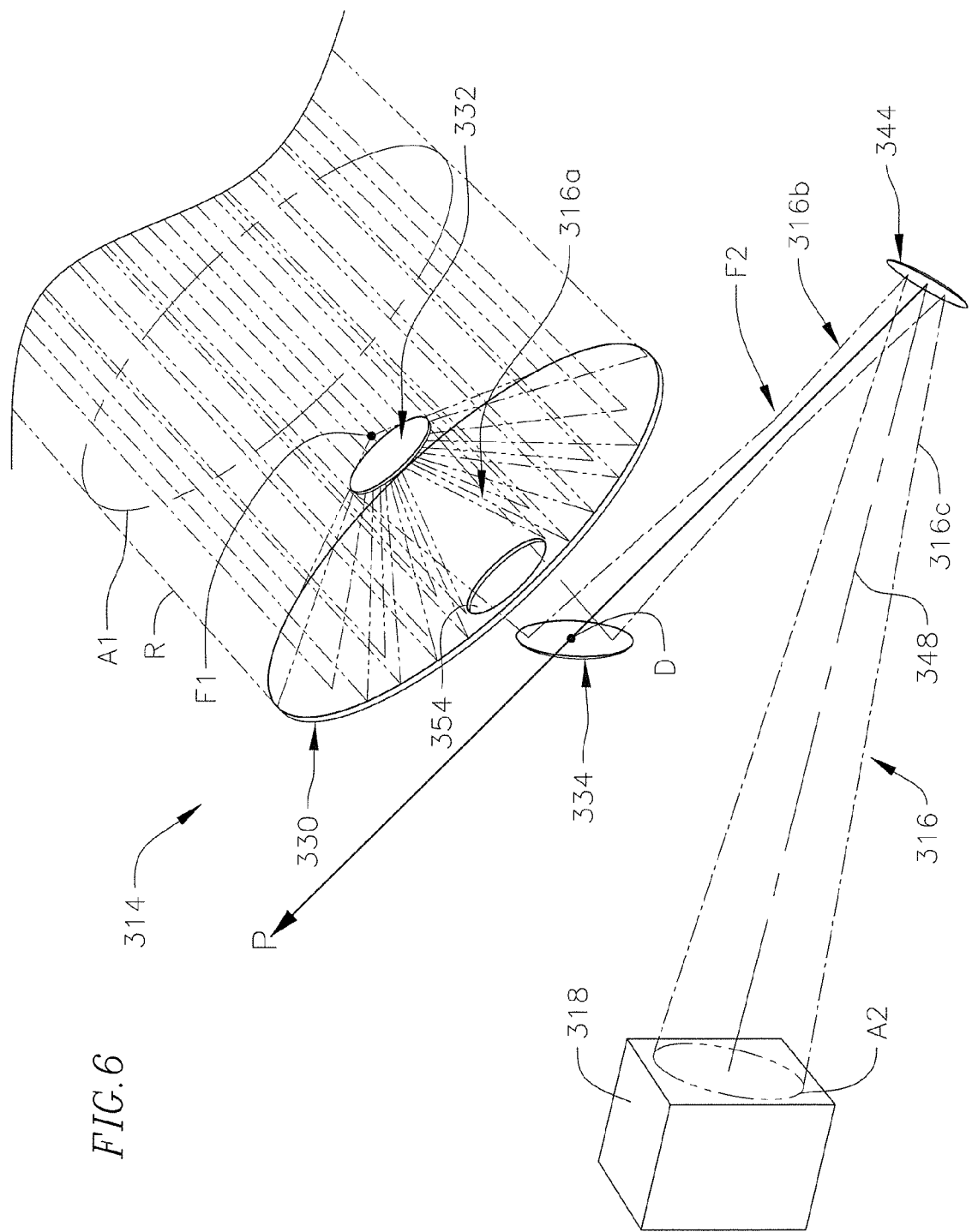
FIG. 6 is a perspective view of a solar concentrator showing traced solar rays, according to an embodiment of the invention.

The configuration of the various components of the concentrator may vary. For example, in the embodiment of FIG. 5, the focal point F of the dish 236 is high enough that the steering element 234 can be positioned above the dish 236. A concentrator 314 according to another embodiment is shown in FIG. 6. In this embodiment, the steering element 334 is located below the collector 330, rather than above the collector. The beam portion 316a passes through the collector 330 to reach the steering element 334. In order to allow the beam to pass through the collector, an opening 354 is formed in the collector 330, along the path of the beam portion 316a, which is along the axis of the dish 336. The opening 354 does not result in the loss of collected sunlight, as this portion of the dish 336 is in shadow, blocked by the beam-forming element 332, which is between the opening 354 and the sun.

In order to deflect the beam in a fixed direction, the steering element 334 is again located at the intersection of the polar axis P and the declination axis D. However, in this embodiment, because the steering element 334 is located below the collector 330, the axes are also located below the collector. As a result, both the collector 330 and the beam-forming element 332 are above the axes, and the center of gravity of the concentrator is also above the axes. Referring back to FIG. 5, the concentrator 214 positions the collector 230 on one side of the axes, and the beam-forming element 232 on the other. This configuration places the center of gravity closer to the axes themselves. In one embodiment, the center of gravity of the concentrator 214 is located on the intersection of axes P and D, where the steering element is located. This facilitates rotation of the components about these axes, as the weight of the components need not be lifted to rotate them, reducing the torque requirements of the tracking system.

As compared to the concentrator 214 of FIG. 5, the concentrator 314 of FIG. 6 requires more energy to rotate the collector and beam-forming element about the axes P and D, because the center of gravity of the concentrator is not located at the intersection of axes P and D. Counterweights may be added to the system to balance the off-set weight. Positioning the steering element 334 below the dish 336 may provide easier manufacturing and installation, and facilitate counter-rotation of the steering element 334 about axis D.

In the embodiments of FIGS. 5 and 6, the beam-forming element (232, 332) is positioned between the collector (230, 330) and its focal point F, and the beam-forming element has a virtual focus that is at or substantially at the same point as the focal point F. Also, in both embodiments, the steering element (234, 334) is located at the intersection of the polar axis P and the declination axis D.

Although two configurations are shown in FIGS. 5 and 6, other variations among the components are possible, such as using a lens-based system, or other combinations of optical components. For example, in one embodiment, the beam-forming element 232 and steering element 234 are combined into one optical element 231', as shown schematically in FIG. 5A. In one embodiment, the optical element 231' may be an off-axis paraboloid deflector, such as an off-axis concave reflector. This off-axis optical element 231' is positioned at the intersection of the polar and declination axes, and is counter-rotated about the declination axis, to send the beam 216 in a fixed direction. The primary collector 230' is also oriented off-axis, not directly at the sun, to divert incoming light rays R toward the combined optical element 231'. The optical element 231' combines the functionality of intercepting the collected rays from the collector, concentrating the rays into a beam 216, and sending the beam in a desired direction along the beam output path. Providing one optical deflector instead of two can be beneficial to reduce losses, such as, for example, reflectivity losses. Also, the off-axis optical elements 230', 231' may be arranged such that the collector 230' has an unobstructed view of the sun. In other embodiments, the off-axis optical elements may have differing shapes other than paraboloid.

The concentrators 214, 314 in FIGS. 5 and 6 are designed to utilize four deflectors (elements 230, 232, 234, 244 and 330, 332, 334, 344) to collect sunlight, form it into a beam, and steer it toward the receiver. Four deflectors are utilized so that one of them may be fixed (element 244, 344), while the others rotate. This design is useful for scaling up to a large system with multiple pods each including multiple concentrators. Referring back to FIG. 1, each pod 11 includes an array 12 of concentrators 14. The concentrators 14 in the array 12 are positioned at various locations with respect to the receiver 18. Each one of these concentrators 14 sends its beam 16 in a slightly different direction in order to converge the beams 16 on the receiver. This variation can be accommodated by the fixed deflector—fixed steering element 244 and 344 in FIGS. 5 and 6. Each concentrator 14 in the array 12 (FIG. 1) can include the same collector (230, 330), beam-forming element (232, 332), and initial steering element (234, 334), regardless of the location of the concentrator in the array 12. In order to steer the resulting beam to the receiver, the fixed steering element (244, 344) is set to the appropriate angle for each concentrator, such that the output path 48 of the beam from that concentrator reaches the receiver 18. The ability to use the same first three deflectors, changing only the shape (curvature) and/or orientation of the last deflector, facilitates easy and efficient bulk manufacture, installation, and repairs of all of the concentrators in the array 12. As noted further below, in another embodiment, optionally, other differences may be incorporated into the concentrators depending on their location within the array 12.

The deflectors in the concentrators are referred to above as the collector, beam-forming element, initial steering element, and fixed steering element. When these components are mirrors, they may be referred to as the first, second, third, and fourth mirrors. The first or primary mirror collects incident rays of sunlight and focuses them toward a focal point. The second or secondary mirror inverts this focusing arrangement and forms the converging rays into a concentrated beam of sunlight. The third or tertiary mirror intercepts this beam and sends it in a fixed direction, toward the fourth mirror. The fourth mirror is oriented in order to send this beam along the output path toward the receiver. In one embodiment, the first, second, and third mirrors rotate about a polar axis during the day, tracking the sun as it crosses the sky. The third mirror is mounted on the polar axis, and deflects the beam in a fixed direction along the polar axis to the fourth mirror. These mirrors may also rotate about a declination axis, with the third mirror rotating in the opposition direction as the first and second mirrors, as described above. The concentrator with these various deflectors may be referred to as a beam-waveguide system or a beam-waveguide reflector.

Although four deflectors or mirrors are shown in FIGS. 5 and 6, a concentrator may include only three mirrors, or five mirrors, for example, to include an extra steering mirror to send the beam toward the receiver. For example, a fifth mirror may be used to allow collectors to be located also south of the receiver, as indicated in FIGS. 9A, 9B, and 10A-D. In each case, each concentrator collects incident rays of sunlight and form them into a concentrated beam that is steered to the receiver.

Referring again to FIG. 5, the solar concentrator 214 is configured to steer the solar beam 216 near the ground 126. In one embodiment, the beam 216 passes approximately 8-10 feet above the ground, for safety reasons, to enable safe passage below the beam for animals or humans. In one embodiment, the solar beam is approximately parallel with the ground 126 as the beam travels to the receiver. At least a portion of the beam output path 148 is approximately parallel to the ground. In particular, the portion of the beam output path 148 exiting the fixed steering element 244 is approximately parallel with the ground. The beam is described as "approximately parallel" as it may be converging or diverging, or steered at a slight angle, depending on the particular installation, slight differences in elevation between the collector and the receiver, and the location and size of the receiver. However, the receiver may be positioned at ground level, rather than being elevated above the concentrators in order to receive the beams 216. In one embodiment, at least a portion of the beams travels below the concentrators, such as below the collectors 230, to reach the receiver. At least a portion of the receiver is positioned below the concentrators to receive the beams. In one embodiment, the beams from all of the concentrators in the array travel to the receiver at approximately the same elevation above the ground, and in one embodiment, this elevation is lower than the elevation of the solar collectors.

In FIG. 6, the solar rays R are traced for illustration. The elements of the concentrator 314 may be referred to as a primary mirror 330 (for example, a parabolic dish mirror), a secondary mirror 332, a tertiary mirror 334, and a fixed mirror 344. The primary mirror 330 collects incident rays of sunlight and reflects them toward focal point F1. The primary mirror 330 collects rays of light within an area A1, which is the projected area of the primary mirror 330 along its central axis. The secondary mirror 332 inverts the focusing arrangement of the primary mirror and forms the rays into a beam, which passes through an opening 354 in the primary mirror 330 and intersects the tertiary mirror 334. The tertiary mirror reflects the beam to the fixed mirror 344, which reflects the beam to a receiver 318. The beam arrives at the receiver 318 with area A2.

The ratio of A1 to A2 provides the concentration factor for the concentrator 314. The concentrator collects light from an area A1, and the beam 316 arrives at the receiver 318 with area A2. The ratio of A1 divided by A2 is the concentration factor, i.e., the amount of concentration provided by the concentrator 314. For example, a concentrator that has a collecting dish with a 10 m diameter and a beam with a 1 m diameter at the receiver has a concentration factor of 100 (the ratio of the areas). This dish can collect about 1 kilowatt of solar power per square meter, corresponding to the solar fluence, and the beam formed provides about 100 kilowatts per square meter to the receiver. The concentration factor is a relationship between the convergence of the beam and the distance of travel of the beam. According to an embodiment of the invention, the concentration factor of the concentrator(s) in the solar power system is between about 50 to 200, or in another embodiment, between about 50-100, or in another embodiment between about 100-250, or in another embodiment at least 30, or at least 50, or at least 100. In one embodiment, the concentration factor is approximately 100, and in another embodiment, approximately 50, and in another embodiment approximately 200. In one embodiment, A2 is a disc of approximately 1-1.5 meters in diameter.

Referring again to FIG. 6, in this embodiment, the secondary mirror 332 is positioned such that its virtual focus is in front of the focus F1 of the primary mirror, such that the resulting beam is slowly converging, rather than being parallel. In one embodiment, the secondary mirror 332 is positioned at approximately 90% of the distance from the collector 330 to the focal point F1. The converging beam 316 has an intermediate focus F2 located between the tertiary mirror 334 and the fixed mirror 344. This focus F2 is referred to as an "intermediate" focus because it is located along the beam output path 348, before reaching the receiver 318. After passing through the intermediate focus F2, the beam diverges as it approaches the receiver 318. Forming a beam with an intermediate focus helps to limit the size of the mirrors, by narrowing the size of the beam that impacts the mirrors. While smaller mirrors may be less expensive in terms of materials and installation costs, they may require high-precision machining for precise curvature, and they are more likely to overheat due to the higher concentration of the beam reflecting on the mirror. These factors are considered to arrive at an appropriate beam size and mirror size for a particular installation.

Figure 7:
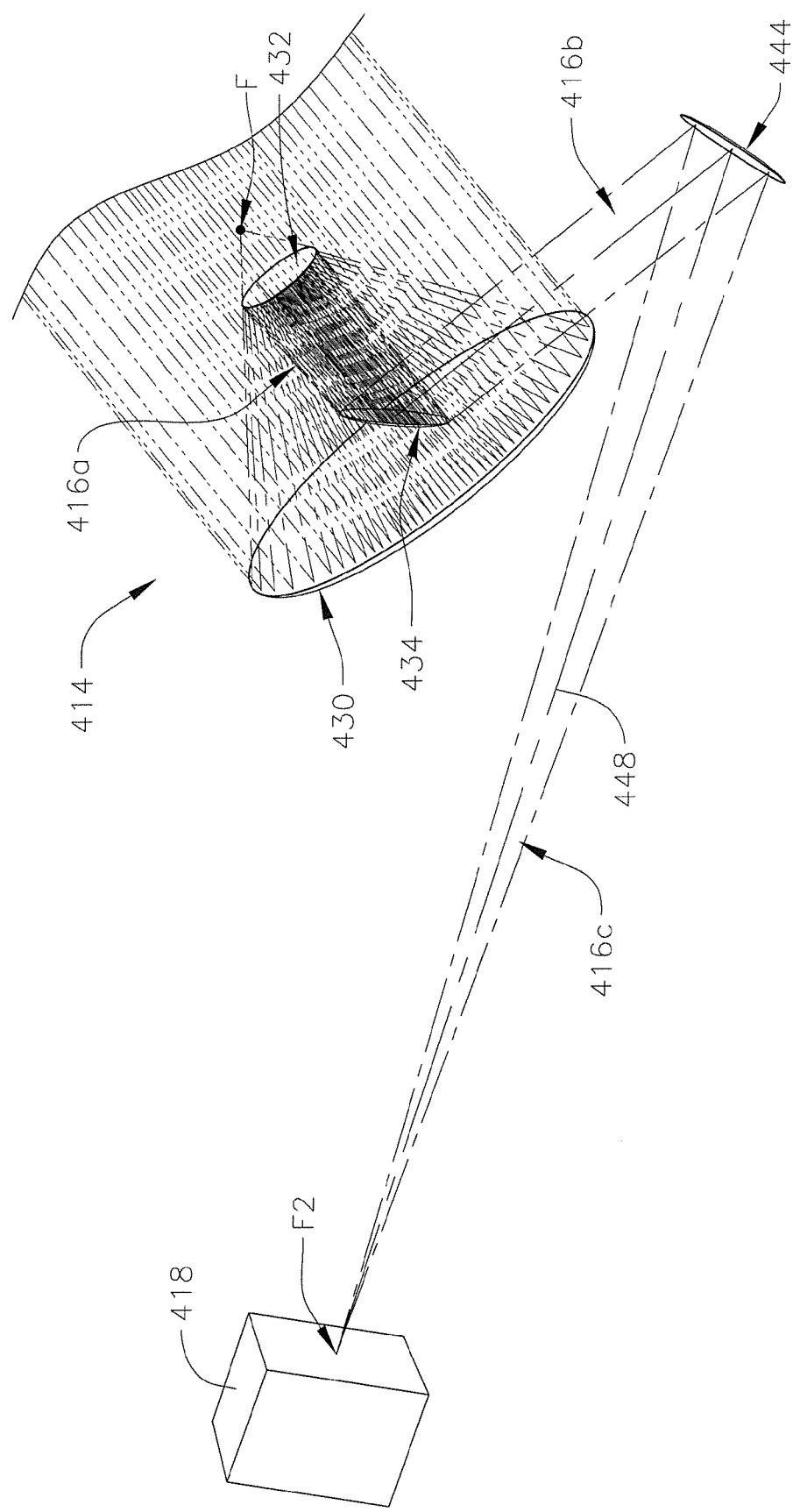
FIG. 7 is a perspective view of a solar concentrator showing traced solar rays, according to an embodiment of the invention.

A solar concentrator 414 according to an embodiment of the invention is shown in FIG. 7. In this embodiment, the tertiary mirror 434 is located above the primary mirror 430, and is positioned to form a parallel beam 416b. The parallel beam 416b is focused into a converging beam 416c by the fourth mirror 444. The beam slowly converges until it reaches its focus F2 at the receiver 418. The beam has no intermediate focus before reaching the receiver. It should be noted that in FIG. 7, for clarity, only rays from the center of the sun are traced.

Figure 8:
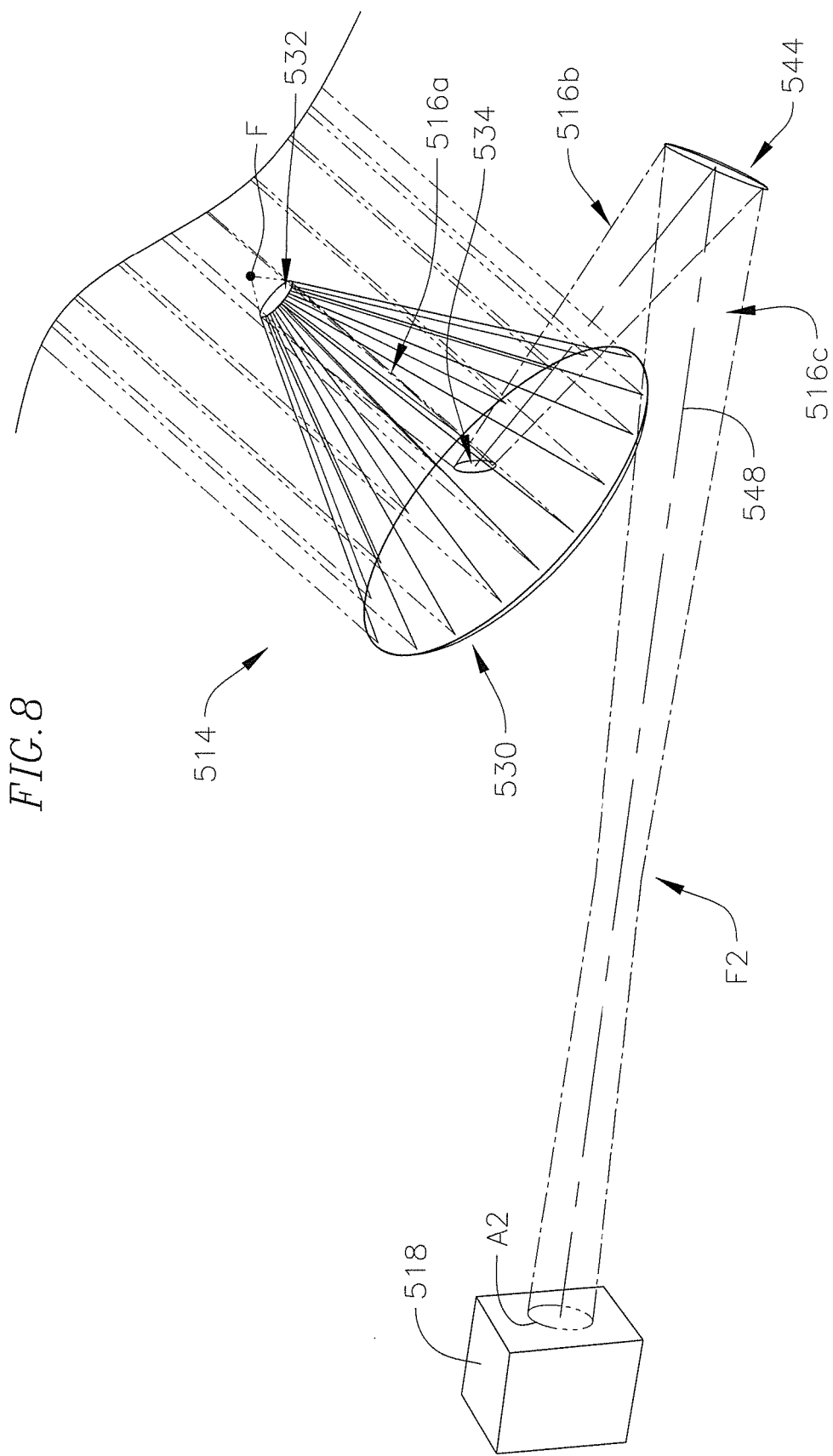
FIG. 8 is a perspective view of a solar concentrator showing traced solar rays, according to an embodiment of the invention.

A solar concentrator 514 according to an embodiment of the invention is shown in FIG. 8. In this embodiment, the secondary mirror 532 is positioned with its virtual focus behind the focus F1, to form a diverging beam 516a. The tertiary mirror 534 reflects the beam into portion 516b, which is diverging toward the fourth, fixed mirror 544. In this embodiment, the fourth mirror 544 is concave, rather than flat, counter-acting the divergence of the beam 516b and forming it into a converging beam 516c as it heads toward the receiver. The converging beam 516c has an intermediate focus F2 between the fourth mirror 544 and the receiver 518. Providing a converging beam from the fourth mirror provides additional flexibility, as the receiver may be positioned in front of or behind the intermediate focus F2 without changing the area A2 of the beam impacting the receiver 518. The receiver can be positioned the same distance away from F2 either in front of it or behind F2, and the resulting area A2 will be the same. When the receiver is positioned in front of F2, the beam 516c converges toward the receiver, and when the receiver is positioned behind F2, the beam diverges toward the receiver. Providing a beam with an intermediate focus may also reduce the size of the deflectors in the beam output path.

The appropriate size, shape, and relative position of the mirrors depend on the desired shape of the beam. Comparing FIGS. 6, 7, and 8, the distance between the first and second mirrors varies. The sizes of the second and third mirrors also vary. These figures provide illustrative examples only, and many other configurations are possible. As shown and described above, in various embodiments, the steering elements (the third and fourth deflectors) contribute to the beam-forming function by further shaping and directing the beam, after it leaves the first beam-forming element (the second deflector). The steering elements may also be referred to as beam-forming elements. In one embodiment, a solar concentrator includes a primary collector and a plurality of beam-forming deflectors.

A number of solar concentrators may be grouped together into an array of concentrators with a single receiver for the entire array. The array of concentrators together with the receiver may be referred to as a pod (or a solar-concentrator pod). A solar power system 10 including a single solar concentrator pod 60 is shown in FIG. 9A. The pod 60 includes an array 12 of concentrators 14 arranged about a receiver 18. In this embodiment, the array is arranged in a spiral configuration, with the concentrators 14 laid out in spiral arms 13 that spiral out from the receiver 18. Each concentrator 14 sends a concentrated beam 16 of sunlight to the receiver 18, and as shown in the figure, each concentrator 14 has an unobstructed line of sight to the receiver, for the path of the beam 16. The pod 60 in FIG. 9A includes 36 concentrators 14. The layout of the concentrators in the pod is designed such that the concentrators do not substantially shade each other from the sun, or block the path of the beams 16 to the receiver.

Each spiral arm 13 includes six concentrators 14 spaced increasingly further from the receiver 18. The concentrator closest to the receiver sends its beam 16 a distance D1 from the concentrator to the receiver 18. The next concentrator sends its beam 16 a longer distance D2, and so on to the concentrator at the perimeter of the pod 60, which sends its beam the longest distance D6. These distances may be referred to as the throw distance of the beam. In one embodiment, the ratio of the largest to the smallest throw distance is limited, so that the number and variation in different beams arriving at the receiver is controlled. For example, in one embodiment, the ratio of largest to smallest throw distance (D6 to D1) is approximately 10 or less. In another embodiment, the ratio is larger. For example, the throw distance may be increased by adding intermediate deflectors between the concentrator and the receiver to further extend the beam output path and the throw distance. A beam may be collected and thrown again multiple times, across a large distance, by the use of additional deflectors (e.g., intermediate mirrors).

A solar power system may include one pod or multiple pods. A solar power system 610 including multiple pods 660 is shown in FIG. 9B (see also FIG. 1). The pods are arranged in a tight configuration, with the outer boundaries of each field 21 (see FIG. 9A) overlapping each other to conserve space. The system 610 in FIG. 9B includes 16 pods, each pod having 36 concentrators. This system may be referred to as a 16×36 system.

Each pod 660 includes its own receiver to receive the beams from the concentrators in that pod. As a result, the distance of travel of the beams is reduced, and the beams need not travel to a single central location for the entire system 610.

Figure 10A:
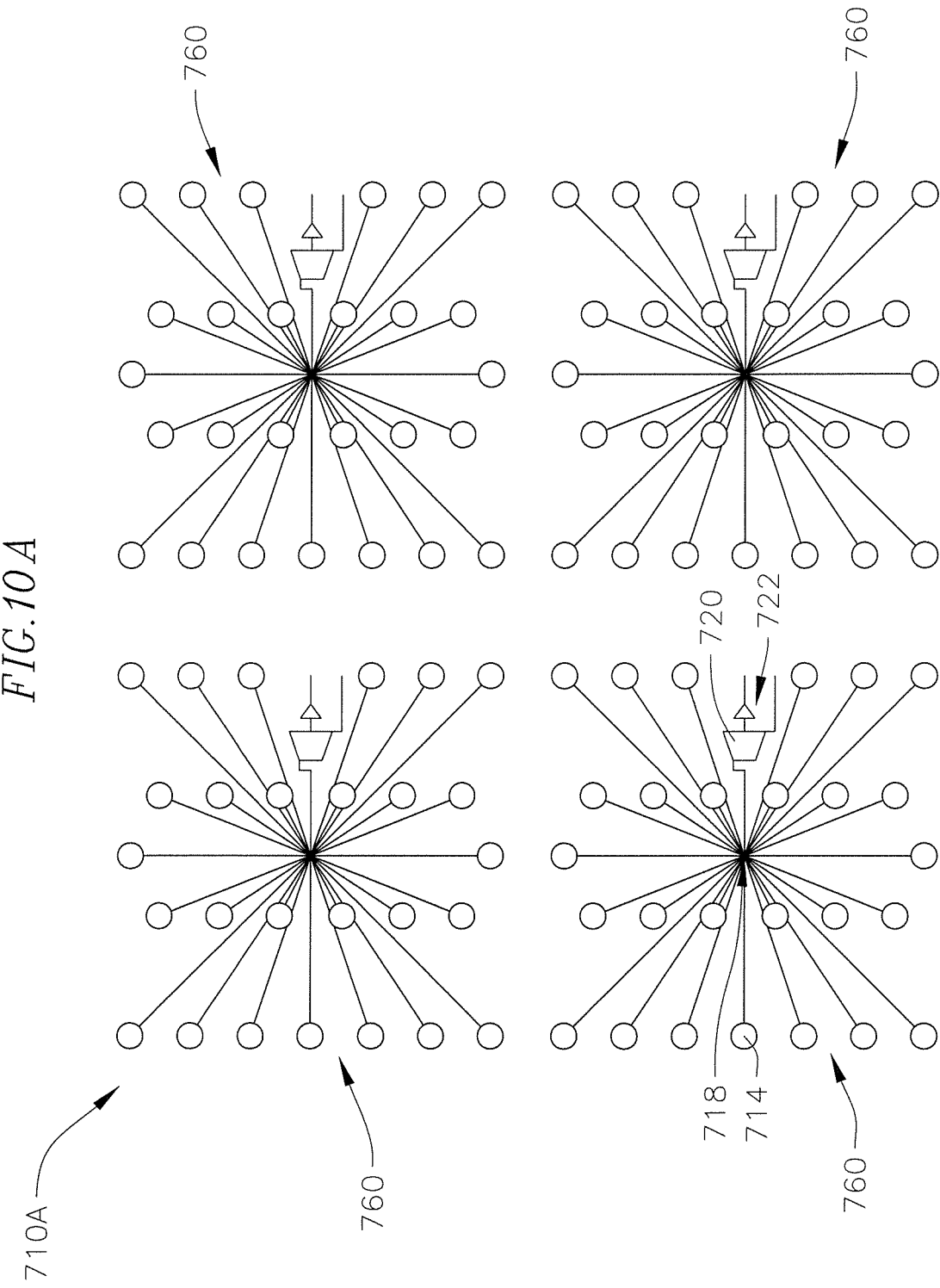

A solar power system 710A according to another embodiment of the invention is shown in FIG. 10A. In this embodiment, the system 710A includes four pods 760 of 27 concentrators each (a 4×27 system). Each pod 760 includes a central receiver 718 that is coupled to a power conversion unit or electric generator 722, which converts heat to electricity. In one embodiment, the power conversion unit 722 includes a turbine 720. The output from the turbine is electricity. As shown in FIG. 10A, the turbine 720 occupies the position of one concentrator on the right-hand side (in the figure) of the array. The mirror image on the left-hand side includes a concentrator 714 at the position of the turbine.

Only four pods are shown in the system of FIG. 10A, but the system may be scaled up or down by adding or removing pods 760. The modular pod system enables each installation to be sized according to its output needs. The pods may be duplicated as needed to arrive at the desired power output. The number of pods can also be varied based on the local terrain and land availability. Additionally, each pod may be located at a different elevation than the adjacent pod. This flexibility enables the solar power system to be located on sloped land without grading the entire land area to the same flat elevation. Rather, each individual pod may be graded to a substantially flat level, but each pod may be at a different elevation. Furthermore, the fixed steering element (such as element 244 in FIG. 5) can be adjusted to angle the beam up or down to accommodate a slight slope in the ground. Thus, in one embodiment, each pod can accommodate a land slope of several degrees, for example, up to 7 degrees. With this flexibility, the amount of land suitable for an installation of a solar power system is increased.

Figure 10B:
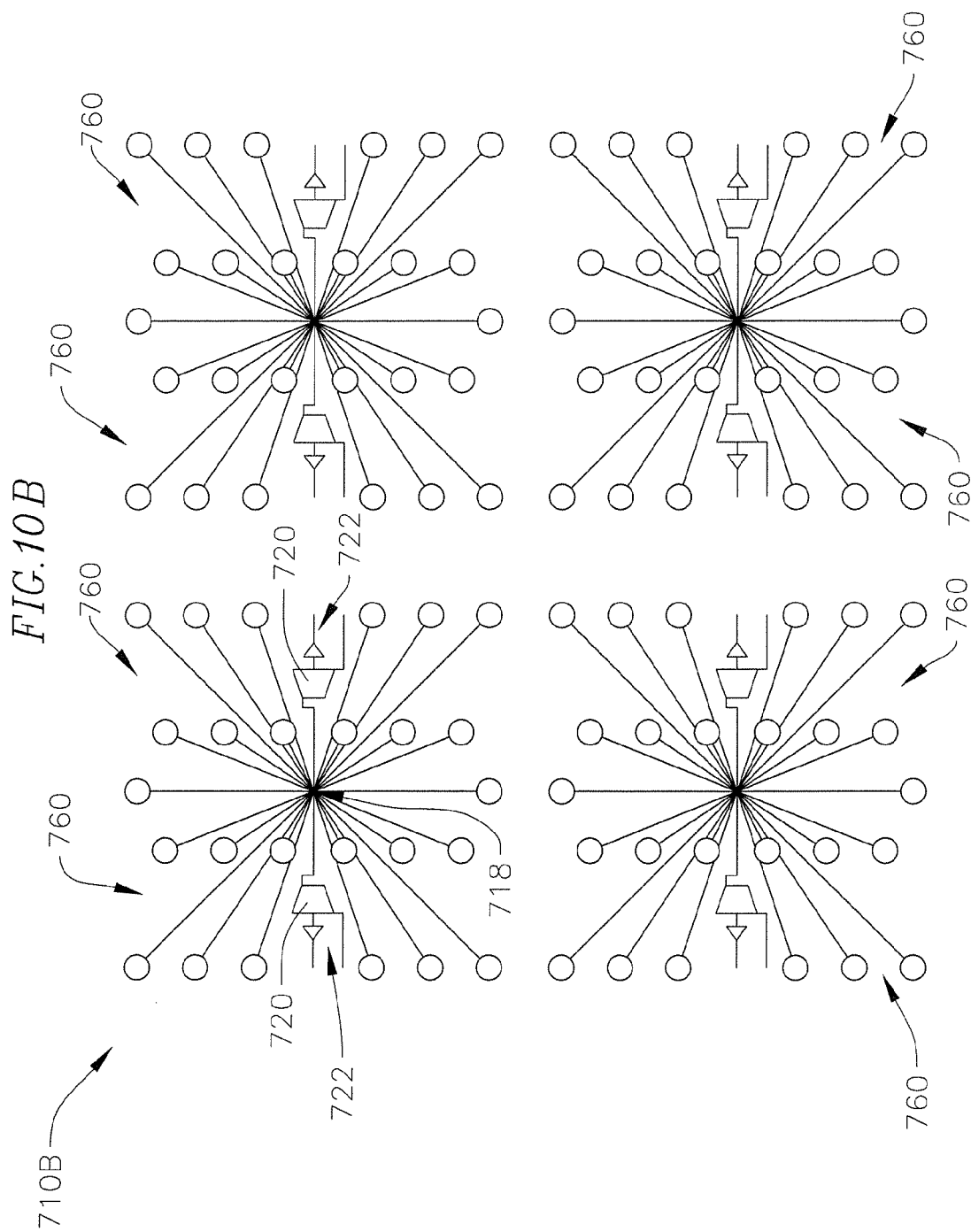

A solar power system 710B according to another embodiment of the invention is shown in FIG. 10B. The system 710B includes eight pods 760 of thirteen concentrators each (an 8×13 system). Each pod 760 has its own turbine 720. However, the central receiver 718 is shared by the two adjacent pods 760. The heat from the receiver 718 is divided and sent to the two turbines 720.

A solar power system 710C according to another embodiment of the invention is shown in FIG. 10C. The system 710C includes four pods 760 of twenty-six concentrators each (a 4×26 system). Each pod directs solar beams to a single central receiver 718. The heat collected from two pods is then combined to drive a single electric generator 722. That is, this system utilizes two pods per generator.

A solar power system 710D according to another embodiment of the invention is shown in FIG. 10D. The system 710D has the same layout as the system 710C (FIG. 10C), but with the addition of an integrated energy storage system 724. The energy storage system 724 stores heat from the associated receivers 718 (or single receiver, in other embodiments). The ability to store this heat for later use separates the energy collection from the energy usage. The heat may be used to drive the generator at any time, and not only when the sun is shining. This heat storage enables the generator to provide electricity after the sun has set. The heat storage also averages out fluctuations in sunlight during the day. For example, when the sun passes behind a cloud, the electric output from the generator does not plummet, as long as heat is stored in the energy storage system. Heat is collected into the energy storage system while the sun is shining, and electricity is generated by the turbine 720 according to demand. The energy-storage system enables the solar power system to match the demand curve for the power utility. The energy-storage system isolates the power production from the power use. In one embodiment, the energy-storage system includes a thermally insulated tank 764.

Figure 10E:
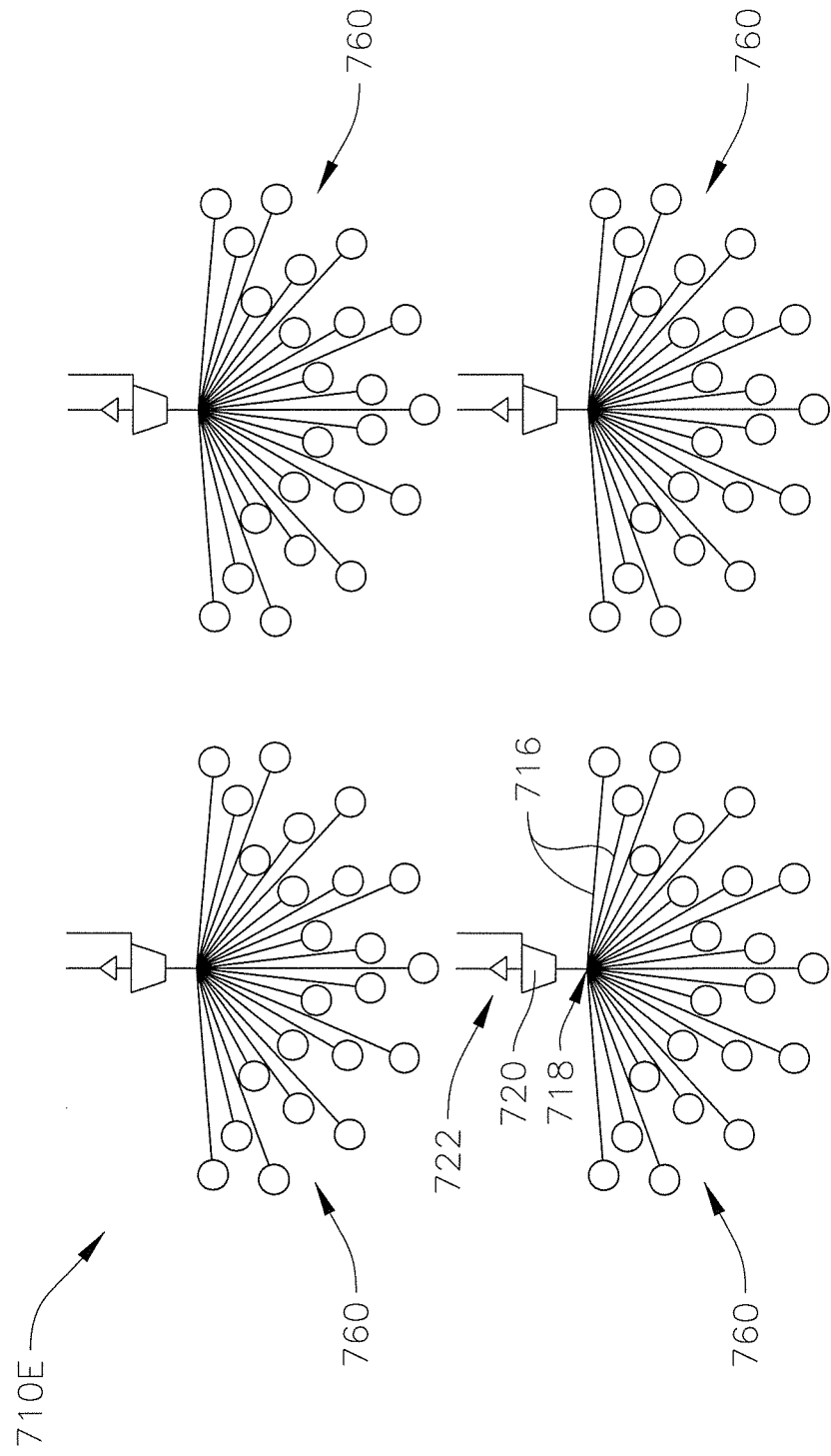

A solar-power system 710E according to another embodiment of the invention is shown in FIG. 10E. The system 710E includes four pods 760 of 23 concentrators each. Each pod includes one receiver 718. In this embodiment, all pods 760 are located between the receiver 718 and the Earth's equator. That is, in the northern hemisphere, the pods are located to the south of the receiver, and in the southern hemisphere, the pods are located to the north of the receiver. This design reduces the size of the fixed steering element, such as, for example, the fixed steering element 244 in FIG. 5. The fixed steering element sends the beam 216 toward the receiver (to the left in FIG. 5). If the same concentrator is used on the opposite side of the receiver, the beam would exit to the opposite direction (i.e., to the right in FIG. 5). To send the beam in that direction, the size of the fixed steering element 244 would need to be increased. Alternatively, an additional fixed steering element may be added to send the beam in the opposite direction (to the right in FIG. 5). Because of the added expense of either increasing the size of the fixed steering element or adding a second fixed steering element, in one embodiment, the pods are all located on the same side of the receiver (with respect to the equator). However, in other embodiments, the concentrators in a pod surround the receiver.

In one embodiment, a solar-power system includes M pods each having N concentrators in the pod. This may be referred to as an M×N system. In one embodiment, the number M ranges from 10-50, and N ranges from 10-100. In another embodiment, a single concentrator may be used without incorporating it into a pod. That is, a single concentrator or a small group of concentrators may be used to collect sunlight and concentrate the sunlight into a beam to heat and drive a small power conversion unit, such as a Stirling engine.

Within a single pod, each concentrator (14, 214, 314, etc.) may differ based on its location in the pod. As noted above, the collector, beam-forming element, and first steering element may be the same in each concentrator, with only the fixed steering element adjusted for each concentrator to direct the beam output path toward the receiver. However, in other embodiments, the beam-forming element may also vary based on the location of the concentrator in the array of concentrators in the pod. For example, in one embodiment, the beam-forming element is moved forward or backward with respect to the collector in order to adjust the convergence of the beam, such that the beams from the various concentrators arrive at the receiver with the same area A2 (FIG. 6) despite their different throw distances. Otherwise, the beams from the concentrators farther from the receiver may be larger or smaller in cross-section (area A2) than the beams from the concentrators closer to the receiver. For uniform and even heating of the receiver, it is beneficial to provide the same or similar area A2 for all incoming beams, and to have these areas A2 overlapping each other. This reduces the ratio of peak power to average power incident at the receiver. The size and path of the beams may be controlled to overlap the beams at the receiver, to control a power density distribution at the receiver. In one embodiment, the angle of convergence or divergence of the beam decreases with increasing distance from the receiver, in order to provide the same incident area (beam cross-sectional area) at the receiver. As noted above, the size of the beam at the receiver gives the concentration factor for the concentrator (for a given collection area).

When the beam-forming element is moved closer or farther from the collector to adjust the convergence of the beam, the concentrators closer and farther from the receiver may all be manufactured with the same components. That is, the collector, beam-forming element, and initial steering element may all be virtually identical in manufacture. When installed, the location of the beam-forming element can be adjusted according to the concentrator's distance from the receiver. This provides ease in the manufacture, operations, and maintenance of the various concentrators.

In another embodiment, the concentrators farther from the receiver may utilize larger mirrors, to collect more sunlight and form a larger beam, so that the convergence of the larger beam results in the same incident area A2 at the receiver as compared to the concentrators closer to the receiver. In another embodiment, the beam-forming element may be shaped to have a different focal point, to provide a different beam convergence, based on the location of the concentrator in the array. However, for ease of manufacturing, it may be preferred to adjust the location of the mirrors rather than the size or shape, as noted above.

In another embodiment, the changes between concentrators depending on their position within the array are accomplished by the fourth mirror or the fixed steering element. This deflector is positioned at the necessary angle to send the beam from the concentrator to the receiver, based on the position of the concentrator in the array. Thus, from concentrator to concentrator, the particular orientation of the fixed steering element changes. Also, the curvature of the fixed steering element may change, in order to provide a different angle of convergence depending on the position of the concentrator relative to the receiver. Concentrators close to the receiver can include a fixed steering element with greater curvature, providing a greater angle of convergence, as compared to concentrators farther from the receiver, which can include a fixed steering element with less curvature to provide a smaller angle of convergence.

Within each pod, the beams from the concentrators in the array arrive at the receiver, where the solar energy in the beams is converted to heat. Referring to FIGS. 1 and 2, each pod 11 includes a semi-circular array 12 of concentrators centered around the receiver 18, where the concentrated solar beams 16 from the concentrators 14 are directed. In one embodiment, the receiver 18 includes a convex curved outer surface facing the concentrators 14, so that the beams 16 from the various concentrators 14 throughout the array 12 arrive at the receiver 18 at approximately the same angle of incidence. The receiver 18 includes a heat-absorbing surface or surfaces, such as fins or walls, that absorb the heat from the solar beams rather than reflecting it. The receiver also includes insulation for retaining the absorbed heat.

The heat absorbed at the receiver may be transferred to a separate heat-storage system, such as a separate insulated thermal tank, to store the heat for later use. In the embodiment of FIG. 1, the heat-storage system is integrated with the receiver 18. The receiver 18 itself houses a thermal tank and a heat-storage medium, such as a molten-salt solution. No additional piping or tubing is needed to circulate a fluid between the receiver and the storage tank. As a result, heat losses from the flow loop between the receiver and the tank are reduced. The molten salt (or other thermal-storage medium) is heated by the beams 16 at the receiver 18, and stored there until heat is extracted to generate electricity as needed. The integration of the receiver and the heat-storage system reduces complexity and cost as well as heat losses for the system. Except for the surfaces heated by the incident solar beams, the remaining walls of the receiver 18 are insulated to minimize heat losses, and the heat is maintained within the insulated receiver until it is needed to drive the turbine-generator set. In one embodiment, the integrated receiver and heat storage system includes a single insulated tank internally partitioned into hot and cold sub-reservoirs.

The integration of the receiver and the heat-storage system is enabled, at least in part, by tailoring the total power collected per pod into suitable levels, and by the ability of the concentrators to steer the solar beams along or near the ground. The deflectors utilized by the concentrators form the solar beam and steer it along an output path near the ground, rather than reflecting the beam upward to an elevated receiver, as in solar power tower configurations. Accordingly, the receiver may be located on or near the ground. This arrangement allows the receiver to be integrated with a large, insulated tank, without the need to elevate such a tank above the ground. As a result, long lengths of fluid flow between the receiver and the tank are avoided, minimizing pumping-power requirements and heat losses. Additionally, the wound-level receiver is easy to install and access for operations and maintenance activities, as compared to a receiver elevated above the ground.

Furthermore, with the receiver located at or near ground-level, the turbine and electric generator may be located in close proximity to the receiver. The receiver, storage tank, turbine, and electric generator can be located in close proximity to minimize heat losses and pumping power in transfers between these components.

Additional information regarding receiver design for solar power systems may be found in the following detailed report: Falcone, Patricia K., *A Handbook for Solar Central Receiver Design*, Sandia National Laboratories, SAND 86-8009, December 1986.

In an alternate embodiment, the heat-storage system 24 includes an insulated thermal tank or other reservoir, separate from the receiver 18, where heat is stored for later use. In this instance, a flow loop is provided between the receiver 18 and the heat-storage system 24, to transfer heat from the receiver to the storage tank. The heat-storage medium itself may flow through this loop to be heated by the receiver and stored in the storage tank, or a separate transfer fluid may circulate through this loop to carry heat to the storage tank. The heat-storage system may be further divided into two tanks, a hot thermal tank and a cold thermal tank, to store the heat-storage medium before and after it is heated by the receiver.

When electric output from the power system 10 is desired, heat is drawn from the receiver 18 to drive the turbine and generator set power conversion unit. The power conversion unit converts heat from the receiver and/or storage tank to the desired form or power, such as electricity. As shown in FIGS. 1 and 2, in one embodiment, the power conversion unit includes a turbine 20 coupled to an electric generator 22. A heat exchanger 90 connects the turbine 20 to the receiver 18 (or separate thermal tank). The heat exchanger 90 may include a liquid flow loop, and the thermal storage medium itself or a separate transfer fluid circulates through the flow loop to carry heat to the turbine 20. The heat is used to drive the turbine 20 to produce mechanical power output. A separate heat exchanger 80 is connected to the turbine 20 to remove the heat that is rejected, as required by the turbine thermodynamic cycle. The mechanical power output, i.e. the shaft horsepower, from the turbine 20 is used to drive an electric generator 22, which produces electricity.

The turbine 20 is driven by a working fluid such as water, which is used to drive a steam turbine, or helium, or $CO_2$ (such as supercritical CO2), which is used to drive a Brayton-cycle turbine (or other type of turbine). The working fluid is heated by the heat from the heat exchanger 90, and then heat from the working fluid is converted to mechanical power in the turbine engine. As used herein, "turbine" refers to a rotating engine that converts energy from a fluid into a useful output, such as mechanical energy or electricity, as distinguished from a reciprocating engine such as a piston-engine.

Turbines are advantageous for driving electric generators because of their high efficiency, at suitable power levels, and their reliability. Many turbines have a minimum power input that is required to operate the turbine efficiently. As a result, these turbines cannot be utilized in some smaller solar installations, where the solar energy provided to the power conversion unit does not meet this minimum. For example, the solar power collected from a single dish reflector is typically not sufficient to drive a turbine efficiently. Accordingly, in an embodiment of the invention, solar concentrators are grouped together such that the combined solar output from the group of concentrators meets the minimum level required to drive a turbine efficiently.

According to an embodiment of the invention, solar concentrators are arranged in pods that can be sized and scaled to match needs for efficient operation of a particular type of turbine. For example, a steam turbine with a minimum power input level of about 5 megawatts (the thermal power input to the turbine) is matched with a pod that is sized to provide this power input from the solar beams, corresponding to, approximately, five thousand square meters of total collecting surface. The size of the concentrators themselves as well as the number of concentrators in the array can be adjusted to provide a desired thermal power input to the turbine. The type of turbine is selected based on this power input, to provide the most efficient match. In one embodiment, the thermal power collected by the pod and available as power input to the generator is in the range of 5-10 megawatts, and in another embodiment 1-10 megawatts, and in another embodiment 1-20 megawatts. The turbine is selected to approximately match the power level per pod.

In one embodiment, each pod is thermally coupled to a single turbine-generator (such as a single turbine) power-conversion unit. In other embodiments, two pods drive a single turbine-generator. For example, a turbine with an optimal power input of 10 megawatts may be coupled to two 5 megawatt pods (see, for example, FIG. 10C). In a solar-power system with multiple generators, the electricity produced by all generators may be combined and supplied to the utility electric power grid.

However, the system is not limited to turbines, and in other embodiments the electric generator may include other types of systems, such as reciprocating engines or other mechanical units, when these are indicated for power-matching or other purposes. For example, a single solar concentrator (such as 14, 214, etc) or a small group of concentrators may be used to power a single reciprocating engine, such as a Stirling engine, or other type of engine to produce mechanical power to drive an electric generator.

In FIGS. 1 and 2, the receiver 18 and the heat-storage system 24 are combined together into an insulated thermal tank heated by the solar beams 16. In other embodiments, as noted above, the heat-storage system may be provided separately from the receiver, with a heat-exchange flow loop provided between them. In another embodiment, the heat-storage system is optional, and the heat from the receiver may be used directly to drive the power conversion unit. In this case, a heat exchanger flow loop is provided directly between the receiver and the turbine. The receiver may heat the same working fluid that drives the turbine, or a separate transfer fluid that carries heat to the working fluid in the turbine. In other embodiments, a solar-power system may include combinations of these options.

The components of the solar-power system may vary in shape, size, and may be comprised of particular materials according to the particular installation. In one embodiment, the solar collector includes a parabolic or paraboloid dish reflector with a diameter of about 10 m. A dish of this size collects sunlight over an area of about 78 square meters. Across the United States, incident solar rays provide a power of about 1 kilowatt per square meter (in cloud-free conditions), so this dish collects about 78 kilowatts of solar power. The parabolic dish reflector can be manufactured from fiberglass coated with a reflective layer coated by a protective layer, such as a glass or polymer film. In one embodiment, the 10 m dish reflectors are spaced apart from each other by about 50 m in the collecting field 21 (see FIG. 1). In one embodiment, the solar collector includes a parabolic or paraboloid dish reflector with a diameter in the range of 6-10 m, and in one embodiment 10-15 m, and in one embodiment about 8.5 m. The number of collectors per pod can be determined by their diameter and the thermal-power needs of the turbine-generator set. For example, if the optimum power input of a turbine-generator set is 5.3 megawatts, that input level can be provided by thirty collectors with 15 m diameter each, or forty-three collectors with 12.4 m diameter, keeping the product of the number of collectors and the square of their diameter constant. The concept allows for the choice to be made entirely on the basis of cost of fabrication, installation, operations, and maintenance considerations.

In one embodiment, the beam-forming deflector includes a curved mirror with high reflectivity, such as, for example, about 94%, or higher. High reflectivity is desired to reduce solar-power losses and the amount of heat dissipated at the surface of the mirror. This mirror may be made from precision-machined aluminum with deposition coatings forming a reflective surface. Because the beam-forming element is smaller in size than the collector, the dimensional tolerances are tighter. In one embodiment, the beam-forming element is approximately 10% the size of the primary collector. In one embodiment, the first steering element includes a planar, flat mirror with high reflectivity.

In one embodiment, the combined electric power output from the pod(s) in the solar power system is in the range of approximately 50-100 megawatts, and in another embodiment, 50-200 megawatts, and in another embodiment 100-150 megawatts, and in another embodiment 150-200 megawatts. The target power output can be achieved by scaling the arrays of concentrators into pods, and providing the number of pods necessary to reach the target power output to be placed on the grid.

In one embodiment, a concentrating solar-power system as disclosed herein provides an overall efficiency (electric power output per unit of incident solar power collected) estimated to be in the range of 26-28%.

In one embodiment, a solar concentrator includes three deflector elements—a collector, a beam-forming element, and a single steering element. These three deflectors together collect incoming rays of sunlight, form them into a concentrated beam, and steer the beam toward the receiver. This solar concentrator omits the fourth deflector (such as the fixed steering element described above), thereby reducing reflectivity losses, which accrue with each reflecting surface. However, the steering element must be controlled to steer the beam toward the receiver. Also, at certain times of day, the path of the beam to the receiver may be obscured. These factors are taken into account in determining the number of deflectors for the solar concentrators.

In one embodiment, a solar concentrator is utilized in applications other than terrestrial electricity generation. For example, in one embodiment, a solar concentrator is provided on a spacecraft for power generation in space. The whole concentrator assembly may be oriented to point toward the sun, based on the spacecraft's attitude and trajectory. The concentrator collects solar rays in space, concentrates them into a solar beam, and steers the beam to an on-board receiver for the generation of heat. The heat can then be used to power the spacecraft as needed, such as by generating electricity. In another embodiment, a solar concentrator is provided for power generation on the moon, planets, or small bodies such as asteroids, in a manner similar to the terrestrial application.

Figure 11:
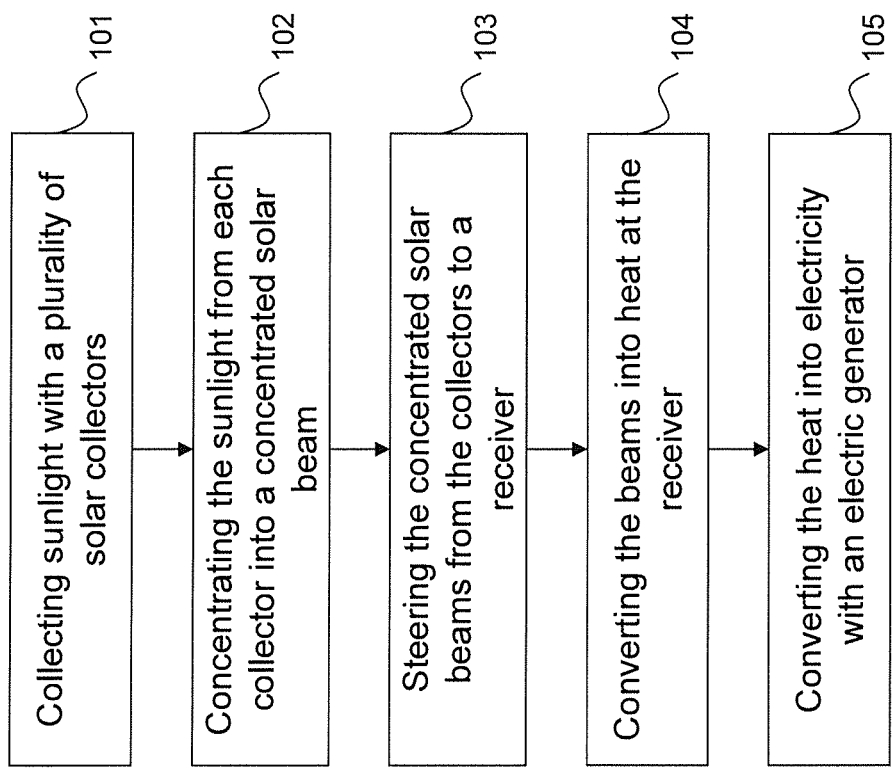
FIG. 11 is a flowchart of a method for generating electricity from sunlight, according to an embodiment of the invention.

In one embodiment, a method for generating electricity from sunlight is provided, as shown in FIG. 11. The method includes collecting sunlight with a plurality of solar collectors (101), concentrating the sunlight from each collector into a concentrated solar beam (102), and steering the concentrated solar beams from the collectors to a receiver (103). The method also includes converting the beams into heat at the receiver (104), and converting the heat into electricity with an electric generator (105). In one embodiment, the receiver includes a fluid, and converting the beams into heat includes heating the fluid. The fluid may be the working fluid for the generator. Alternatively, or in addition, heat from the receiver may be stored prior to converting the heat into electricity. The method may also include rotating the solar collectors to track the sun, and counter-rotating a steering element to steer the beam to the receiver along a fixed beam output path.

Various embodiments of the invention are described above, to provide an efficient concentrating solar-power system utilizing an array of solar concentrators that form and steer concentrated solar beams. As described above, various embodiments enable a solar-power system that provides sufficient solar power to drive a turbine to produce electricity. The system can be scaled to provide electricity at the utility-grid scale, such as around 100 megawatts. According to various embodiments, the system provides an integrated receiver and energy-storage system, reducing heat losses and isolating electricity consumption from solar thermal heat generation. The receiver and steered solar beams are located at or near ground level, enabling integration and access for operations and maintenance. The modular pod design allows the system to be scaled up or down, and to accommodate variations in terrain, such as moderate ground slope. The use of concentrated solar beams, steered mirrors, sun tracking, and integrated heat storage helps to increase the overall efficiency of the system so as to provide a high electric power output per solar radiation input.

The deflectors utilized in the solar concentrator may be combinations of mirrors, reflective surfaces, or other optical components, such as lenses, that can divert solar rays as described above to form and steer a concentrated solar beam. Many options are available for the optical system, such as a Cassegrain reflector system, a Gregorian reflector system, a Fresnel refractive (lens) or reflective system, and other reflective mirror systems. The shape and position of the optical elements may vary in individual installations.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A solar concentrator for concentrating sunlight and forming sunlight into a beam, the solar concentrator comprising:
   a solar collector comprising a curved reflective surface shaped to divert rays of sunlight and being rotatable to track the sun;
   a beam-forming reflector positioned to intercept the diverted rays of sunlight from the solar collector, the beam-forming reflector shaped to concentrate the diverted rays of sunlight into a beam; and
   at least one steering reflector shaped and positioned to deflect the beam along a beam output path; and
   wherein the at least one steering reflector comprises a first steering reflector located between the solar collector and the beam-forming reflector, the first steering reflector having a reflective surface directed toward the beam-forming reflector and rotatable with respect to the solar collector and the beam-forming reflector.

2. The solar concentrator of claim 1, wherein the curved reflective surface of the solar collector has a focal point, and wherein the beam-forming reflector is offset from the focal point.

3. The solar concentrator of claim 2, wherein the beam-forming reflector is positioned between the solar collector and its focal point.

4. The solar concentrator of claim 1, wherein the solar concentrator is configured so that a portion of the beam output path passes along a polar axis.

5. The solar concentrator of claim 1, wherein the beam-forming reflector is rotatable to track the sun.

6. The solar concentrator of claim 1, wherein the first steering reflector is counter-rotatable to steer the beam along the beam output path.

7. The solar concentrator of claim 6, wherein the solar concentrator is configured so that the beam output path is received by a fixed surface.

8. The solar concentrator of claim 1, wherein the curved reflective surface of the solar collector comprises a first mirror, the beam-forming reflector comprises a second mirror, and the first steering reflector comprises a third mirror.

9. The solar concentrator of claim 1, wherein the at least one steering reflector further comprises a second steering reflector, wherein the second steering reflector is fixed at an orientation to steer the beam along the beam output path.

10. The solar concentrator of claim 1, wherein the solar concentrator is configured so that the beam output path passes at an elevation lower than the solar collector.

11. The solar concentrator of claim 1, wherein the solar collector comprises a parabolic or paraboloid dish.

12. The solar concentrator of claim 1, wherein the beam-forming reflector comprises a curved reflective surface, and wherein a curvature of the beam-forming reflector is configured to be adjusted based on a distance between the beam-forming reflector and the solar collector.

13. The solar concentrator of claim 1, wherein the solar collector comprises a concave shape.

14. The solar concentrator of claim 1, wherein a portion of the beam output path is approximately parallel to the ground.

15. The solar concentrator of claim 1, wherein the beam-forming reflector comprises a second curved reflective surface.

16. A solar power system comprising:
   a plurality of solar concentrators, each solar concentrator for concentrating sunlight and forming-sunlight into a beam, each solar concentrator comprising:
      a solar collector comprising a curved reflective surface-shaped to divert rays of sunlight and being rotatable to track the sun;
      a beam-forming reflector positioned to intercept the diverted rays of sunlight from the solar collector; the beam-forming reflector shaped to concentrate the diverted rays of sunlight into the beam; and
      at least one steering reflector shaped and positioned to deflect the beam along a beam output path,
      wherein the at least one steering reflector comprises a first steering reflector located between the solar collector and the beam-forming reflector, the first steering reflector having a reflective surface directed toward the beam-forming reflector and rotatable with respect to the solar collector and the beam-forming reflector; and
   wherein the plurality of solar concentrators are positioned so that the beams from the plurality of solar concentrators converge at a same fixed location.

17. The solar power system of claim 16, wherein, for at least one of the plurality of solar concentrators, the curved reflective surface of the solar collector has a focal point, and wherein the beam-forming reflector is positioned between the curved reflective surface and the focal point.

18. The solar power system of claim 16, wherein the solar collector comprises a parabolic or paraboloid mirror.

19. The solar power system of claim 16, further comprising a receiver located at the fixed location, the receiver configured to receive the beams from the plurality of solar concentrators and to convert the beams into heat, and wherein, for each solar concentrator, the at least one steering reflector further comprises a second steering reflector positioned between the first steering reflector and the receiver along the beam output path.

20. The solar power system of claim 19, wherein the second steering reflector is fixed, and wherein the beam-forming reflector and the first steering reflector are configured to rotate to track the sun.

21. The solar power system of claim 19, wherein first and second solar concentrators within the plurality of solar concentrators are located at different first and second distances from the receiver, and wherein first and second steering reflectors of the first and second solar concentrators, respectively, are configured to steer the beam across the first and second distances; respectively.

22. The solar power system of claim 16, wherein, for at least one of the plurality of solar concentrators, the curved reflective surface of the solar collector has a focal point, and wherein the focal point is located between the curved reflective surface and the beam-forming reflector.

23. The solar power system of claim 16, further comprising a receiver located at the fixed location, the receiver configured to receive the beams from the plurality of solar concentrators and to convert the beams into heat.

24. The solar power system of claim 23, further comprising an energy storage system for storing at least a portion of the heat from the receiver.

25. The solar power system of claim 23, further comprising a power-conversion unit coupled to the receiver for converting the heat into electricity.

26. The solar power system of claim 25, wherein the power conversion unit comprises a turbine.

27. The solar power system of claim 23, wherein the receiver is located at ground level.

28. The solar power system of claim 23, wherein the plurality of solar concentrators are located at different angles radial to the receiver.

29. The solar power system of claim 16, wherein the solar power system is arranged in a pod within a system comprising a plurality of pods, each pod comprising the solar power system comprising the plurality of solar concentrators and a receiver located at the fixed location wherein the beams from the plurality of solar concentrators are configured to converge, the receiver configured to receive the beams from the plurality of solar concentrators and to convert the beams into heat.

30. The solar power system of claim 16, wherein at least a portion of the output path passes below the concentrator.

31. The solar power system of claim 16, wherein each solar concentrator has a concentration factor of at least 30.

32. The solar power system of claim 16, wherein, for each solar concentrator, the curved reflective surface of the solar collector comprises a first mirror, the beam-forming reflector comprises a second mirror, and the first steering reflector comprises a third mirror.

33. The solar power system of claim 16, wherein the fixed location is at ground level.

34. A method for generating electricity from sunlight by concentrating sunlight and forming sunlight into beams, the method comprising:
concentrating rays of sunlight using a plurality of solar concentrators, wherein each solar concentrator comprises:
a solar collector comprising a curved reflective surface rotatable to track the sun,
a beam-forming reflector, and
at least one steering reflector;
diverting the rays of sunlight with each of the curved reflective surfaces of the solar collectors to the beam-forming reflectors;
intercepting the diverted rays of sunlight with each of the beam-forming reflectors of the plurality of solar concentrators;
concentrating the diverted rays of sunlight into a beam with each of the beam-forming reflectors;
deflecting the beams from the beam-forming reflectors along a beam output path with each of the at least one steering reflectors of the plurality of solar concentrators, wherein each at least one steering reflector comprises a first steering reflector located between the solar collector and the beam-forming reflector, the first steering reflector having a reflective surface directed toward the beam-forming reflector and rotatable with respect to the solar collector and the beam forming reflector;
steering the beams from the at least one steering reflectors to a single receiver; and
rotating the solar collectors to track the sun.

35. The method of claim 34, further comprising the steps of:
converting the beams into heat at the receiver; and
converting the heat into electricity with a first power-conversion unit.

36. The method of claim 35, further comprising:
concentrating sunlight and forming sunlight into beams using a second plurality of solar concentrators;
steering the beams from the second plurality of solar concentrators to a second receiver;
converting the beams into heat at the second receiver;
converting the heat into electricity with a second power-conversion unit; and
combining the electricity from the first and second power-conversion units.

37. The method of claim 35, further comprising storing the heat prior to converting the heat into electricity.

38. The method of claim 34, further comprising counter-rotating the first steering reflectors of the plurality of solar concentrators to steer the beams to the receiver along a fixed beam output path.

39. The method of claim 34, further comprising overlapping the beams at the receiver to control a concentration and power-density distribution at the receiver.

40. The method of claim 34, wherein the plurality of solar concentrators are located at different angles radial to the receiver.

41. The method of claim 34, wherein a ratio of an area of sunlight collected at each solar collector of the plurality of solar concentrators to a cross-section of each of the beams at the receiver is at least 30.

* * * * *